(12) United States Patent
Song

(10) Patent No.: US 7,778,459 B2
(45) Date of Patent: Aug. 17, 2010

(54) IMAGE ENCODING/DECODING METHOD AND APPARATUS

(75) Inventor: Byung-cheol Song, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 786 days.

(21) Appl. No.: 11/785,665

(22) Filed: Apr. 19, 2007

(65) Prior Publication Data

US 2008/0043840 A1    Feb. 21, 2008

(30) Foreign Application Priority Data

Aug. 16, 2006    (KR) .................... 10-2006-0077122

(51) Int. Cl.
  *G06K 9/36* (2006.01)
  *G06K 9/00* (2006.01)
(52) U.S. Cl. ..................................... 382/166
(58) Field of Classification Search ............... 382/166, 382/232–251; 375/240.01–240.29; 358/539, 358/426.01–426.16, 1.9; 341/65, 63, 67
  See application file for complete search history.

(56) References Cited

U.S. PATENT DOCUMENTS

| | | | | |
|---|---|---|---|---|
| 5,680,129 A | * | 10/1997 | Weinberger et al. ........... 341/65 |
| 5,905,812 A | * | 5/1999 | Kim ........................... 382/236 |
| 6,611,620 B1 | * | 8/2003 | Kobayashi et al. .......... 382/166 |
| 6,785,425 B1 | * | 8/2004 | Feder et al. ................. 382/247 |
| 2003/0147005 A1 | | 8/2003 | Okamoto et al. |
| 2005/0013370 A1 | | 1/2005 | Kim et al. |
| 2005/0281473 A1 | | 12/2005 | Kim et al. |
| 2007/0154087 A1 | * | 7/2007 | Cho et al. ................... 382/166 |

* cited by examiner

*Primary Examiner*—Sherali Ishrat
(74) *Attorney, Agent, or Firm*—Sughrue Mion, PLLC

(57) ABSTRACT

Provided are an image encoding/decoding method and apparatus, in which one of a plurality of color component images of an input image is predicted from a different color component image using a correlation between the color component images and the encoding order of the plurality of color component images is adaptively determined according to the characteristics of the input image. In the image encoding method and apparatus, prediction errors or the amounts of generated bits for the remaining color component images predicted using a previously encoded color component image according to encoding orders are compared to determine the optimal encoding order and encoding is performed using a correlation between the color component images according to the determined encoding order.

34 Claims, 21 Drawing Sheets

| $g_{0,0}$ | $g_{0,1}$ | $g_{0,2}$ | $g_{0,3}$ | $g_{0,4}$ | $g_{0,5}$ | $g_{0,6}$ | $g_{0,7}$ | $g_{0,8}$ | $g_{0,9}$ | $g_{0,10}$ | $g_{0,11}$ | $g_{0,12}$ | $g_{0,13}$ | $g_{0,14}$ | $g_{0,15}$ |
|---|---|---|---|---|---|---|---|---|---|---|---|---|---|---|---|
| $g_{1,0}$ | $g_{1,1}$ | $g_{1,2}$ | $g_{1,3}$ | $g_{1,4}$ | $g_{1,5}$ | $g_{1,6}$ | $g_{1,7}$ | $g_{1,8}$ | $g_{1,9}$ | $g_{1,10}$ | $g_{1,11}$ | $g_{1,12}$ | $g_{1,13}$ | $g_{1,14}$ | $g_{1,15}$ |
| $g_{2,0}$ | $g_{2,1}$ | $g_{2,2}$ | $g_{2,3}$ | $g_{2,4}$ | $g_{2,5}$ | $g_{2,6}$ | $g_{2,7}$ | $g_{2,8}$ | $g_{2,9}$ | $g_{2,10}$ | $g_{2,11}$ | $g_{2,12}$ | $g_{2,13}$ | $g_{2,14}$ | $g_{2,15}$ |
| $g_{3,0}$ | $g_{3,1}$ | $g_{3,2}$ | $g_{3,3}$ | $g_{3,4}$ | $g_{3,5}$ | $g_{3,6}$ | $g_{3,7}$ | $g_{3,8}$ | $g_{3,9}$ | $g_{3,10}$ | $g_{3,11}$ | $g_{3,12}$ | $g_{3,13}$ | $g_{3,14}$ | $g_{3,15}$ |
| $g_{4,0}$ | $g_{4,1}$ | $g_{4,2}$ | $g_{4,3}$ | $g_{4,4}$ | $g_{4,5}$ | $g_{4,6}$ | $g_{4,7}$ | $g_{4,8}$ | $g_{4,9}$ | $g_{4,10}$ | $g_{4,11}$ | $g_{4,12}$ | $g_{4,13}$ | $g_{4,14}$ | $g_{4,15}$ |
| $g_{5,0}$ | $g_{5,1}$ | $g_{5,2}$ | $g_{5,3}$ | $g_{5,4}$ | $g_{5,5}$ | $g_{5,6}$ | $g_{5,7}$ | $g_{5,8}$ | $g_{5,9}$ | $g_{5,10}$ | $g_{5,11}$ | $g_{5,12}$ | $g_{5,13}$ | $g_{5,14}$ | $g_{5,15}$ |
| $g_{6,0}$ | $g_{6,1}$ | $g_{6,2}$ | $g_{6,3}$ | $g_{6,4}$ | $g_{6,5}$ | $g_{6,6}$ | $g_{6,7}$ | $g_{6,8}$ | $g_{6,9}$ | $g_{6,10}$ | $g_{6,11}$ | $g_{6,12}$ | $g_{6,13}$ | $g_{6,14}$ | $g_{6,15}$ |
| $g_{7,0}$ | $g_{7,1}$ | $g_{7,2}$ | $g_{7,3}$ | $g_{7,4}$ | $g_{7,5}$ | $g_{7,6}$ | $g_{7,7}$ | $g_{7,8}$ | $g_{7,9}$ | $g_{7,10}$ | $g_{7,11}$ | $g_{7,12}$ | $g_{7,13}$ | $g_{7,14}$ | $g_{7,15}$ |
| $g_{8,0}$ | $g_{8,1}$ | $g_{8,2}$ | $g_{8,3}$ | $g_{8,4}$ | $g_{8,5}$ | $g_{8,6}$ | $g_{8,7}$ | $g_{8,8}$ | $g_{8,9}$ | $g_{8,10}$ | $g_{8,11}$ | $g_{8,12}$ | $g_{8,13}$ | $g_{8,14}$ | $g_{8,15}$ |
| $g_{9,0}$ | $g_{9,1}$ | $g_{9,2}$ | $g_{9,3}$ | $g_{9,4}$ | $g_{9,5}$ | $g_{9,6}$ | $g_{9,7}$ | $g_{9,8}$ | $g_{9,9}$ | $g_{9,10}$ | $g_{9,11}$ | $g_{9,12}$ | $g_{9,13}$ | $g_{9,14}$ | $g_{9,15}$ |
| $g_{10,0}$ | $g_{10,1}$ | $g_{10,2}$ | $g_{10,3}$ | $g_{10,4}$ | $g_{10,5}$ | $g_{10,6}$ | $g_{10,7}$ | $g_{10,8}$ | $g_{10,9}$ | $g_{10,10}$ | $g_{10,11}$ | $g_{10,12}$ | $g_{10,13}$ | $g_{10,14}$ | $g_{10,15}$ |
| $g_{11,0}$ | $g_{11,1}$ | $g_{11,2}$ | $g_{11,3}$ | $g_{11,4}$ | $g_{11,5}$ | $g_{11,6}$ | $g_{11,7}$ | $g_{11,8}$ | $g_{11,9}$ | $g_{11,10}$ | $g_{11,11}$ | $g_{11,12}$ | $g_{11,13}$ | $g_{11,14}$ | $g_{11,15}$ |
| $g_{12,0}$ | $g_{12,1}$ | $g_{12,2}$ | $g_{12,3}$ | $g_{12,4}$ | $g_{12,5}$ | $g_{12,6}$ | $g_{12,7}$ | $g_{12,8}$ | $g_{12,9}$ | $g_{12,10}$ | $g_{12,11}$ | $g_{12,12}$ | $g_{12,13}$ | $g_{12,14}$ | $g_{12,15}$ |
| $g_{13,0}$ | $g_{13,1}$ | $g_{13,2}$ | $g_{13,3}$ | $g_{13,4}$ | $g_{13,5}$ | $g_{13,6}$ | $g_{13,7}$ | $g_{13,8}$ | $g_{13,9}$ | $g_{13,10}$ | $g_{13,11}$ | $g_{13,12}$ | $g_{13,13}$ | $g_{13,14}$ | $g_{13,15}$ |
| $g_{14,0}$ | $g_{14,1}$ | $g_{14,2}$ | $g_{14,3}$ | $g_{14,4}$ | $g_{14,5}$ | $g_{14,6}$ | $g_{14,7}$ | $g_{14,8}$ | $g_{14,9}$ | $g_{14,10}$ | $g_{14,11}$ | $g_{14,12}$ | $g_{14,13}$ | $g_{14,14}$ | $g_{14,15}$ |
| $g_{15,0}$ | $g_{15,1}$ | $g_{15,2}$ | $g_{15,3}$ | $g_{15,4}$ | $g_{15,5}$ | $g_{15,6}$ | $g_{15,7}$ | $g_{15,8}$ | $g_{15,9}$ | $g_{15,10}$ | $g_{15,11}$ | $g_{15,12}$ | $g_{15,13}$ | $g_{15,14}$ | $g_{15,15}$ |

| $b_{0,0}$ | $b_{0,1}$ | $b_{0,2}$ | $b_{0,3}$ | $b_{0,4}$ | $b_{0,5}$ | $b_{0,6}$ | $b_{0,7}$ | $b_{0,8}$ | $b_{0,9}$ | $b_{0,10}$ | $b_{0,11}$ | $b_{0,12}$ | $b_{0,13}$ | $b_{0,14}$ | $b_{0,15}$ |
|---|---|---|---|---|---|---|---|---|---|---|---|---|---|---|---|
| $b_{1,0}$ | $b_{1,1}$ | $b_{1,2}$ | $b_{1,3}$ | $b_{1,4}$ | $b_{1,5}$ | $b_{1,6}$ | $b_{1,7}$ | $b_{1,8}$ | $b_{1,9}$ | $b_{1,10}$ | $b_{1,11}$ | $b_{1,12}$ | $b_{1,13}$ | $b_{1,14}$ | $b_{1,15}$ |
| $b_{2,0}$ | $b_{2,1}$ | $b_{2,2}$ | $b_{2,3}$ | $b_{2,4}$ | $b_{2,5}$ | $b_{2,6}$ | $b_{2,7}$ | $b_{2,8}$ | $b_{2,9}$ | $b_{2,10}$ | $b_{2,11}$ | $b_{2,12}$ | $b_{2,13}$ | $b_{2,14}$ | $b_{2,15}$ |
| $b_{3,0}$ | $b_{3,1}$ | $b_{3,2}$ | $b_{3,3}$ | $b_{3,4}$ | $b_{3,5}$ | $b_{3,6}$ | $b_{3,7}$ | $b_{3,8}$ | $b_{3,9}$ | $b_{3,10}$ | $b_{3,11}$ | $b_{3,12}$ | $b_{3,13}$ | $b_{3,14}$ | $b_{3,15}$ |
| $b_{4,0}$ | $b_{4,1}$ | $b_{4,2}$ | $b_{4,3}$ | $b_{4,4}$ | $b_{4,5}$ | $b_{4,6}$ | $b_{4,7}$ | $b_{4,8}$ | $b_{4,9}$ | $b_{4,10}$ | $b_{4,11}$ | $b_{4,12}$ | $b_{4,13}$ | $b_{4,14}$ | $b_{4,15}$ |
| $b_{5,0}$ | $b_{5,1}$ | $b_{5,2}$ | $b_{5,3}$ | $b_{5,4}$ | $b_{5,5}$ | $b_{5,6}$ | $b_{5,7}$ | $b_{5,8}$ | $b_{5,9}$ | $b_{5,10}$ | $b_{5,11}$ | $b_{5,12}$ | $b_{5,13}$ | $b_{5,14}$ | $b_{5,15}$ |
| $b_{6,0}$ | $b_{6,1}$ | $b_{6,2}$ | $b_{6,3}$ | $b_{6,4}$ | $b_{6,5}$ | $b_{6,6}$ | $b_{6,7}$ | $b_{6,8}$ | $b_{6,9}$ | $b_{6,10}$ | $b_{6,11}$ | $b_{6,12}$ | $b_{6,13}$ | $b_{6,14}$ | $b_{6,15}$ |
| $b_{7,0}$ | $b_{7,1}$ | $b_{7,2}$ | $b_{7,3}$ | $b_{7,4}$ | $b_{7,5}$ | $b_{7,6}$ | $b_{7,7}$ | $b_{7,8}$ | $b_{7,9}$ | $b_{7,10}$ | $b_{7,11}$ | $b_{7,12}$ | $b_{7,13}$ | $b_{7,14}$ | $b_{7,15}$ |
| $b_{8,0}$ | $b_{8,1}$ | $b_{8,2}$ | $b_{8,3}$ | $b_{8,4}$ | $b_{8,5}$ | $b_{8,6}$ | $b_{8,7}$ | $b_{8,8}$ | $b_{8,9}$ | $b_{8,10}$ | $b_{8,11}$ | $b_{8,12}$ | $b_{8,13}$ | $b_{8,14}$ | $b_{8,15}$ |
| $b_{9,0}$ | $b_{9,1}$ | $b_{9,2}$ | $b_{9,3}$ | $b_{9,4}$ | $b_{9,5}$ | $b_{9,6}$ | $b_{9,7}$ | $b_{9,8}$ | $b_{9,9}$ | $b_{9,10}$ | $b_{9,11}$ | $b_{9,12}$ | $b_{9,13}$ | $b_{9,14}$ | $b_{9,15}$ |
| $b_{10,0}$ | $b_{10,1}$ | $b_{10,2}$ | $b_{10,3}$ | $b_{10,4}$ | $b_{10,5}$ | $b_{10,6}$ | $b_{10,7}$ | $b_{10,8}$ | $b_{10,9}$ | $b_{10,10}$ | $b_{10,11}$ | $b_{10,12}$ | $b_{10,13}$ | $b_{10,14}$ | $b_{10,15}$ |
| $b_{11,0}$ | $b_{11,1}$ | $b_{11,2}$ | $b_{11,3}$ | $b_{11,4}$ | $b_{11,5}$ | $b_{11,6}$ | $b_{11,7}$ | $b_{11,8}$ | $b_{11,9}$ | $b_{11,10}$ | $b_{11,11}$ | $b_{11,12}$ | $b_{11,13}$ | $b_{11,14}$ | $b_{11,15}$ |
| $b_{12,0}$ | $b_{12,1}$ | $b_{12,2}$ | $b_{12,3}$ | $b_{12,4}$ | $b_{12,5}$ | $b_{12,6}$ | $b_{12,7}$ | $b_{12,8}$ | $b_{12,9}$ | $b_{12,10}$ | $b_{12,11}$ | $b_{12,12}$ | $b_{12,13}$ | $b_{12,14}$ | $b_{12,15}$ |
| $b_{13,0}$ | $b_{13,1}$ | $b_{13,2}$ | $b_{13,3}$ | $b_{13,4}$ | $b_{13,5}$ | $b_{13,6}$ | $b_{13,7}$ | $b_{13,8}$ | $b_{13,9}$ | $b_{13,10}$ | $b_{13,11}$ | $b_{13,12}$ | $b_{13,13}$ | $b_{13,14}$ | $b_{13,15}$ |
| $b_{14,0}$ | $b_{14,1}$ | $b_{14,2}$ | $b_{14,3}$ | $b_{14,4}$ | $b_{14,5}$ | $b_{14,6}$ | $b_{14,7}$ | $b_{14,8}$ | $b_{14,9}$ | $b_{14,10}$ | $b_{14,11}$ | $b_{14,12}$ | $b_{14,13}$ | $b_{14,14}$ | $b_{14,15}$ |
| $b_{15,0}$ | $b_{15,1}$ | $b_{15,2}$ | $b_{15,3}$ | $b_{15,4}$ | $b_{15,5}$ | $b_{15,6}$ | $b_{15,7}$ | $b_{15,8}$ | $b_{15,9}$ | $b_{15,10}$ | $b_{15,11}$ | $b_{15,12}$ | $b_{15,13}$ | $b_{15,14}$ | $b_{15,15}$ |

| $r_{0,0}$ | $r_{0,1}$ | $r_{0,2}$ | $r_{0,3}$ | $r_{0,4}$ | $r_{0,5}$ | $r_{0,6}$ | $r_{0,7}$ | $r_{0,8}$ | $r_{0,9}$ | $r_{0,10}$ | $r_{0,11}$ | $r_{0,12}$ | $r_{0,13}$ | $r_{0,14}$ | $r_{0,15}$ |
|---|---|---|---|---|---|---|---|---|---|---|---|---|---|---|---|
| $r_{1,0}$ | $r_{1,1}$ | $r_{1,2}$ | $r_{1,3}$ | $r_{1,4}$ | $r_{1,5}$ | $r_{1,6}$ | $r_{1,7}$ | $r_{1,8}$ | $r_{1,9}$ | $r_{1,10}$ | $r_{1,11}$ | $r_{1,12}$ | $r_{1,13}$ | $r_{1,14}$ | $r_{1,15}$ |
| $r_{2,0}$ | $r_{2,1}$ | $r_{2,2}$ | $r_{2,3}$ | $r_{2,4}$ | $r_{2,5}$ | $r_{2,6}$ | $r_{2,7}$ | $r_{2,8}$ | $r_{2,9}$ | $r_{2,10}$ | $r_{2,11}$ | $r_{2,12}$ | $r_{2,13}$ | $r_{2,14}$ | $r_{2,15}$ |
| $r_{3,0}$ | $r_{3,1}$ | $r_{3,2}$ | $r_{3,3}$ | $r_{3,4}$ | $r_{3,5}$ | $r_{3,6}$ | $r_{3,7}$ | $r_{3,8}$ | $r_{3,9}$ | $r_{3,10}$ | $r_{3,11}$ | $r_{3,12}$ | $r_{3,13}$ | $r_{3,14}$ | $r_{3,15}$ |
| $r_{4,0}$ | $r_{4,1}$ | $r_{4,2}$ | $r_{4,3}$ | $r_{4,4}$ | $r_{4,5}$ | $r_{4,6}$ | $r_{4,7}$ | $r_{4,8}$ | $r_{4,9}$ | $r_{4,10}$ | $r_{4,11}$ | $r_{4,12}$ | $r_{4,13}$ | $r_{4,14}$ | $r_{4,15}$ |
| $r_{5,0}$ | $r_{5,1}$ | $r_{5,2}$ | $r_{5,3}$ | $r_{5,4}$ | $r_{5,5}$ | $r_{5,6}$ | $r_{5,7}$ | $r_{5,8}$ | $r_{5,9}$ | $r_{5,10}$ | $r_{5,11}$ | $r_{5,12}$ | $r_{5,13}$ | $r_{5,14}$ | $r_{5,15}$ |
| $r_{6,0}$ | $r_{6,1}$ | $r_{6,2}$ | $r_{6,3}$ | $r_{6,4}$ | $r_{6,5}$ | $r_{6,6}$ | $r_{6,7}$ | $r_{6,8}$ | $r_{6,9}$ | $r_{6,10}$ | $r_{6,11}$ | $r_{6,12}$ | $r_{6,13}$ | $r_{6,14}$ | $r_{6,15}$ |
| $r_{7,0}$ | $r_{7,1}$ | $r_{7,2}$ | $r_{7,3}$ | $r_{7,4}$ | $r_{7,5}$ | $r_{7,6}$ | $r_{7,7}$ | $r_{7,8}$ | $r_{7,9}$ | $r_{7,10}$ | $r_{7,11}$ | $r_{7,12}$ | $r_{7,13}$ | $r_{7,14}$ | $r_{7,15}$ |
| $r_{8,0}$ | $r_{8,1}$ | $r_{8,2}$ | $r_{8,3}$ | $r_{8,4}$ | $r_{8,5}$ | $r_{8,6}$ | $r_{8,7}$ | $r_{8,8}$ | $r_{8,9}$ | $r_{8,10}$ | $r_{8,11}$ | $r_{8,12}$ | $r_{8,13}$ | $r_{8,14}$ | $r_{8,15}$ |
| $r_{9,0}$ | $r_{9,1}$ | $r_{9,2}$ | $r_{9,3}$ | $r_{9,4}$ | $r_{9,5}$ | $r_{9,6}$ | $r_{9,7}$ | $r_{9,8}$ | $r_{9,9}$ | $r_{9,10}$ | $r_{9,11}$ | $r_{9,12}$ | $r_{9,13}$ | $r_{9,14}$ | $r_{9,15}$ |
| $r_{10,0}$ | $r_{10,1}$ | $r_{10,2}$ | $r_{10,3}$ | $r_{10,4}$ | $r_{10,5}$ | $r_{10,6}$ | $r_{10,7}$ | $r_{10,8}$ | $r_{10,9}$ | $r_{10,10}$ | $r_{10,11}$ | $r_{10,12}$ | $r_{10,13}$ | $r_{10,14}$ | $r_{10,15}$ |
| $r_{11,0}$ | $r_{11,1}$ | $r_{11,2}$ | $r_{11,3}$ | $r_{11,4}$ | $r_{11,5}$ | $r_{11,6}$ | $r_{11,7}$ | $r_{11,8}$ | $r_{11,9}$ | $r_{11,10}$ | $r_{11,11}$ | $r_{11,12}$ | $r_{11,13}$ | $r_{11,14}$ | $r_{11,15}$ |
| $r_{12,0}$ | $r_{12,1}$ | $r_{12,2}$ | $r_{12,3}$ | $r_{12,4}$ | $r_{12,5}$ | $r_{12,6}$ | $r_{12,7}$ | $r_{12,8}$ | $r_{12,9}$ | $r_{12,10}$ | $r_{12,11}$ | $r_{12,12}$ | $r_{12,13}$ | $r_{12,14}$ | $r_{12,15}$ |
| $r_{13,0}$ | $r_{13,1}$ | $r_{13,2}$ | $r_{13,3}$ | $r_{13,4}$ | $r_{13,5}$ | $r_{13,6}$ | $r_{13,7}$ | $r_{13,8}$ | $r_{13,9}$ | $r_{13,10}$ | $r_{13,11}$ | $r_{13,12}$ | $r_{13,13}$ | $r_{13,14}$ | $r_{13,15}$ |
| $r_{14,0}$ | $r_{14,1}$ | $r_{14,2}$ | $r_{14,3}$ | $r_{14,4}$ | $r_{14,5}$ | $r_{14,6}$ | $r_{14,7}$ | $r_{14,8}$ | $r_{14,9}$ | $r_{14,10}$ | $r_{14,11}$ | $r_{14,12}$ | $r_{14,13}$ | $r_{14,14}$ | $r_{14,15}$ |
| $r_{15,0}$ | $r_{15,1}$ | $r_{15,2}$ | $r_{15,3}$ | $r_{15,4}$ | $r_{15,5}$ | $r_{15,6}$ | $r_{15,7}$ | $r_{15,8}$ | $r_{15,9}$ | $r_{15,10}$ | $r_{15,11}$ | $r_{15,12}$ | $r_{15,13}$ | $r_{15,14}$ | $r_{15,15}$ |

| $g_{-1,-1}$ | $g_{-1,0}$ | $g_{-1,1}$ | $g_{-1,2}$ | $g_{-1,3}$ | $g_{-1,4}$ | $g_{-1,5}$ | $g_{-1,6}$ | $g_{-1,7}$ | $g_{-1,8}$ | $g_{-1,9}$ | $g_{-1,10}$ | $g_{-1,11}$ | $g_{-1,12}$ | $g_{-1,13}$ | $g_{-1,14}$ | $g_{-1,15}$ |
|---|---|---|---|---|---|---|---|---|---|---|---|---|---|---|---|---|
| $g_{0,-1}$ | $g_{0,0}$ | $g_{0,1}$ | $g_{0,2}$ | $g_{0,3}$ | $g_{0,4}$ | $g_{0,5}$ | $g_{0,6}$ | $g_{0,7}$ | $g_{0,8}$ | $g_{0,9}$ | $g_{0,10}$ | $g_{0,11}$ | $g_{0,12}$ | $g_{0,13}$ | $g_{0,14}$ | $g_{0,15}$ |
| $g_{1,-1}$ | $g_{1,0}$ | $g_{1,1}$ | $g_{1,2}$ | $g_{1,3}$ | $g_{1,4}$ | $g_{1,5}$ | $g_{1,6}$ | $g_{1,7}$ | $g_{1,8}$ | $g_{1,9}$ | $g_{1,10}$ | $g_{1,11}$ | $g_{1,12}$ | $g_{1,13}$ | $g_{1,14}$ | $g_{1,15}$ |
| $g_{2,-1}$ | $g_{2,0}$ | $g_{2,1}$ | $g_{2,2}$ | $g_{2,3}$ | $g_{2,4}$ | $g_{2,5}$ | $g_{2,6}$ | $g_{2,7}$ | $g_{2,8}$ | $g_{2,9}$ | $g_{2,10}$ | $g_{2,11}$ | $g_{2,12}$ | $g_{2,13}$ | $g_{2,14}$ | $g_{2,15}$ |
| $g_{3,-1}$ | $g_{3,0}$ | $g_{3,1}$ | $g_{3,2}$ | $g_{3,3}$ | $g_{3,4}$ | $g_{3,5}$ | $g_{3,6}$ | $g_{3,7}$ | $g_{3,8}$ | $g_{3,9}$ | $g_{3,10}$ | $g_{3,11}$ | $g_{3,12}$ | $g_{3,13}$ | $g_{3,14}$ | $g_{3,15}$ |
| $g_{4,-1}$ | $g_{4,0}$ | $g_{4,1}$ | $g_{4,2}$ | $g_{4,3}$ | $g_{4,4}$ | $g_{4,5}$ | $g_{4,6}$ | $g_{4,7}$ | $g_{4,8}$ | $g_{4,9}$ | $g_{4,10}$ | $g_{4,11}$ | $g_{4,12}$ | $g_{4,13}$ | $g_{4,14}$ | $g_{4,15}$ |
| $g_{5,-1}$ | $g_{5,0}$ | $g_{5,1}$ | $g_{5,2}$ | $g_{5,3}$ | $g_{5,4}$ | $g_{5,5}$ | $g_{5,6}$ | $g_{5,7}$ | $g_{5,8}$ | $g_{5,9}$ | $g_{5,10}$ | $g_{5,11}$ | $g_{5,12}$ | $g_{5,13}$ | $g_{5,14}$ | $g_{5,15}$ |
| $g_{6,-1}$ | $g_{6,0}$ | $g_{6,1}$ | $g_{6,2}$ | $g_{6,3}$ | $g_{6,4}$ | $g_{6,5}$ | $g_{6,6}$ | $g_{6,7}$ | $g_{6,8}$ | $g_{6,9}$ | $g_{6,10}$ | $g_{6,11}$ | $g_{6,12}$ | $g_{6,13}$ | $g_{6,14}$ | $g_{6,15}$ |
| $g_{7,-1}$ | $g_{7,0}$ | $g_{7,1}$ | $g_{7,2}$ | $g_{7,3}$ | $g_{7,4}$ | $g_{7,5}$ | $g_{7,6}$ | $g_{7,7}$ | $g_{7,8}$ | $g_{7,9}$ | $g_{7,10}$ | $g_{7,11}$ | $g_{7,12}$ | $g_{7,13}$ | $g_{7,14}$ | $g_{7,15}$ |
| $g_{8,-1}$ | $g_{8,0}$ | $g_{8,1}$ | $g_{8,2}$ | $g_{8,3}$ | $g_{8,4}$ | $g_{8,5}$ | $g_{8,6}$ | $g_{8,7}$ | $g_{8,8}$ | $g_{8,9}$ | $g_{8,10}$ | $g_{8,11}$ | $g_{8,12}$ | $g_{8,13}$ | $g_{8,14}$ | $g_{8,15}$ |
| $g_{9,-1}$ | $g_{9,0}$ | $g_{9,1}$ | $g_{9,2}$ | $g_{9,3}$ | $g_{9,4}$ | $g_{9,5}$ | $g_{9,6}$ | $g_{9,7}$ | $g_{9,8}$ | $g_{9,9}$ | $g_{9,10}$ | $g_{9,11}$ | $g_{9,12}$ | $g_{9,13}$ | $g_{9,14}$ | $g_{9,15}$ |
| $g_{10,-1}$ | $g_{10,0}$ | $g_{10,1}$ | $g_{10,2}$ | $g_{10,3}$ | $g_{10,4}$ | $g_{10,5}$ | $g_{10,6}$ | $g_{10,7}$ | $g_{10,8}$ | $g_{10,9}$ | $g_{10,10}$ | $g_{10,11}$ | $g_{10,12}$ | $g_{10,13}$ | $g_{10,14}$ | $g_{10,15}$ |
| $g_{11,-1}$ | $g_{11,0}$ | $g_{11,1}$ | $g_{11,2}$ | $g_{11,3}$ | $g_{11,4}$ | $g_{11,5}$ | $g_{11,6}$ | $g_{11,7}$ | $g_{11,8}$ | $g_{11,9}$ | $g_{11,10}$ | $g_{11,11}$ | $g_{11,12}$ | $g_{11,13}$ | $g_{11,14}$ | $g_{11,15}$ |
| $g_{12,-1}$ | $g_{12,0}$ | $g_{12,1}$ | $g_{12,2}$ | $g_{12,3}$ | $g_{12,4}$ | $g_{12,5}$ | $g_{12,6}$ | $g_{12,7}$ | $g_{12,8}$ | $g_{12,9}$ | $g_{12,10}$ | $g_{12,11}$ | $g_{12,12}$ | $g_{12,13}$ | $g_{12,14}$ | $g_{12,15}$ |
| $g_{13,-1}$ | $g_{13,0}$ | $g_{13,1}$ | $g_{13,2}$ | $g_{13,3}$ | $g_{13,4}$ | $g_{13,5}$ | $g_{13,6}$ | $g_{13,7}$ | $g_{13,8}$ | $g_{13,9}$ | $g_{13,10}$ | $g_{13,11}$ | $g_{13,12}$ | $g_{13,13}$ | $g_{13,14}$ | $g_{13,15}$ |
| $g_{14,-1}$ | $g_{14,0}$ | $g_{14,1}$ | $g_{14,2}$ | $g_{14,3}$ | $g_{14,4}$ | $g_{14,5}$ | $g_{14,6}$ | $g_{14,7}$ | $g_{14,8}$ | $g_{14,9}$ | $g_{14,10}$ | $g_{14,11}$ | $g_{14,12}$ | $g_{14,13}$ | $g_{14,14}$ | $g_{14,15}$ |
| $g_{15,-1}$ | $g_{15,0}$ | $g_{15,1}$ | $g_{15,2}$ | $g_{15,3}$ | $g_{15,4}$ | $g_{15,5}$ | $g_{15,6}$ | $g_{15,7}$ | $g_{15,8}$ | $g_{15,9}$ | $g_{15,10}$ | $g_{15,11}$ | $g_{15,12}$ | $g_{15,13}$ | $g_{15,14}$ | $g_{15,15}$ |

| $b_{-1,-1}$ | $b_{-1,0}$ | $b_{-1,1}$ | $b_{-1,2}$ | $b_{-1,3}$ | $b_{-1,4}$ | $b_{-1,5}$ | $b_{-1,6}$ | $b_{-1,7}$ | $b_{-1,8}$ | $b_{-1,9}$ | $b_{-1,10}$ | $b_{-1,11}$ | $b_{-1,12}$ | $b_{-1,13}$ | $b_{-1,14}$ | $b_{-1,15}$ |
|---|---|---|---|---|---|---|---|---|---|---|---|---|---|---|---|---|
| $b_{0,-1}$ | $b_{0,0}$ | $b_{0,1}$ | $b_{0,2}$ | $b_{0,3}$ | $b_{0,4}$ | $b_{0,5}$ | $b_{0,6}$ | $b_{0,7}$ | $b_{0,8}$ | $b_{0,9}$ | $b_{0,10}$ | $b_{0,11}$ | $b_{0,12}$ | $b_{0,13}$ | $b_{0,14}$ | $b_{0,15}$ |
| $b_{1,-1}$ | $b_{1,0}$ | $b_{1,1}$ | $b_{1,2}$ | $b_{1,3}$ | $b_{1,4}$ | $b_{1,5}$ | $b_{1,6}$ | $b_{1,7}$ | $b_{1,8}$ | $b_{1,9}$ | $b_{1,10}$ | $b_{1,11}$ | $b_{1,12}$ | $b_{1,13}$ | $b_{1,14}$ | $b_{1,15}$ |
| $b_{2,-1}$ | $b_{2,0}$ | $b_{2,1}$ | $b_{2,2}$ | $b_{2,3}$ | $b_{2,4}$ | $b_{2,5}$ | $b_{2,6}$ | $b_{2,7}$ | $b_{2,8}$ | $b_{2,9}$ | $b_{2,10}$ | $b_{2,11}$ | $b_{2,12}$ | $b_{2,13}$ | $b_{2,14}$ | $b_{2,15}$ |
| $b_{3,-1}$ | $b_{3,0}$ | $b_{3,1}$ | $b_{3,2}$ | $b_{3,3}$ | $b_{3,4}$ | $b_{3,5}$ | $b_{3,6}$ | $b_{3,7}$ | $b_{3,8}$ | $b_{3,9}$ | $b_{3,10}$ | $b_{3,11}$ | $b_{3,12}$ | $b_{3,13}$ | $b_{3,14}$ | $b_{3,15}$ |
| $b_{4,-1}$ | $b_{4,0}$ | $b_{4,1}$ | $b_{4,2}$ | $b_{4,3}$ | $b_{4,4}$ | $b_{4,5}$ | $b_{4,6}$ | $b_{4,7}$ | $b_{4,8}$ | $b_{4,9}$ | $b_{4,10}$ | $b_{4,11}$ | $b_{4,12}$ | $b_{4,13}$ | $b_{4,14}$ | $b_{4,15}$ |
| $b_{5,-1}$ | $b_{5,0}$ | $b_{5,1}$ | $b_{5,2}$ | $b_{5,3}$ | $b_{5,4}$ | $b_{5,5}$ | $b_{5,6}$ | $b_{5,7}$ | $b_{5,8}$ | $b_{5,9}$ | $b_{5,10}$ | $b_{5,11}$ | $b_{5,12}$ | $b_{5,13}$ | $b_{5,14}$ | $b_{5,15}$ |
| $b_{6,-1}$ | $b_{6,0}$ | $b_{6,1}$ | $b_{6,2}$ | $b_{6,3}$ | $b_{6,4}$ | $b_{6,5}$ | $b_{6,6}$ | $b_{6,7}$ | $b_{6,8}$ | $b_{6,9}$ | $b_{6,10}$ | $b_{6,11}$ | $b_{6,12}$ | $b_{6,13}$ | $b_{6,14}$ | $b_{6,15}$ |
| $b_{7,-1}$ | $b_{7,0}$ | $b_{7,1}$ | $b_{7,2}$ | $b_{7,3}$ | $b_{7,4}$ | $b_{7,5}$ | $b_{7,6}$ | $b_{7,7}$ | $b_{7,8}$ | $b_{7,9}$ | $b_{7,10}$ | $b_{7,11}$ | $b_{7,12}$ | $b_{7,13}$ | $b_{7,14}$ | $b_{7,15}$ |
| $b_{8,-1}$ | $b_{8,0}$ | $b_{8,1}$ | $b_{8,2}$ | $b_{8,3}$ | $b_{8,4}$ | $b_{8,5}$ | $b_{8,6}$ | $b_{8,7}$ | $b_{8,8}$ | $b_{8,9}$ | $b_{8,10}$ | $b_{8,11}$ | $b_{8,12}$ | $b_{8,13}$ | $b_{8,14}$ | $b_{8,15}$ |
| $b_{9,-1}$ | $b_{9,0}$ | $b_{9,1}$ | $b_{9,2}$ | $b_{9,3}$ | $b_{9,4}$ | $b_{9,5}$ | $b_{9,6}$ | $b_{9,7}$ | $b_{9,8}$ | $b_{9,9}$ | $b_{9,10}$ | $b_{9,11}$ | $b_{9,12}$ | $b_{9,13}$ | $b_{9,14}$ | $b_{9,15}$ |
| $b_{10,-1}$ | $b_{10,0}$ | $b_{10,1}$ | $b_{10,2}$ | $b_{10,3}$ | $b_{10,4}$ | $b_{10,5}$ | $b_{10,6}$ | $b_{10,7}$ | $b_{10,8}$ | $b_{10,9}$ | $b_{10,10}$ | $b_{10,11}$ | $b_{10,12}$ | $b_{10,13}$ | $b_{10,14}$ | $b_{10,15}$ |
| $b_{11,-1}$ | $b_{11,0}$ | $b_{11,1}$ | $b_{11,2}$ | $b_{11,3}$ | $b_{11,4}$ | $b_{11,5}$ | $b_{11,6}$ | $b_{11,7}$ | $b_{11,8}$ | $b_{11,9}$ | $b_{11,10}$ | $b_{11,11}$ | $b_{11,12}$ | $b_{11,13}$ | $b_{11,14}$ | $b_{11,15}$ |
| $b_{12,-1}$ | $b_{12,0}$ | $b_{12,1}$ | $b_{12,2}$ | $b_{12,3}$ | $b_{12,4}$ | $b_{12,5}$ | $b_{12,6}$ | $b_{12,7}$ | $b_{12,8}$ | $b_{12,9}$ | $b_{12,10}$ | $b_{12,11}$ | $b_{12,12}$ | $b_{12,13}$ | $b_{12,14}$ | $b_{12,15}$ |
| $b_{13,-1}$ | $b_{13,0}$ | $b_{13,1}$ | $b_{13,2}$ | $b_{13,3}$ | $b_{13,4}$ | $b_{13,5}$ | $b_{13,6}$ | $b_{13,7}$ | $b_{13,8}$ | $b_{13,9}$ | $b_{13,10}$ | $b_{13,11}$ | $b_{13,12}$ | $b_{13,13}$ | $b_{13,14}$ | $b_{13,15}$ |
| $b_{14,-1}$ | $b_{14,0}$ | $b_{14,1}$ | $b_{14,2}$ | $b_{14,3}$ | $b_{14,4}$ | $b_{14,5}$ | $b_{14,6}$ | $b_{14,7}$ | $b_{14,8}$ | $b_{14,9}$ | $b_{14,10}$ | $b_{14,11}$ | $b_{14,12}$ | $b_{14,13}$ | $b_{14,14}$ | $b_{14,15}$ |
| $b_{15,-1}$ | $b_{15,0}$ | $b_{15,1}$ | $b_{15,2}$ | $b_{15,3}$ | $b_{15,4}$ | $b_{15,5}$ | $b_{15,6}$ | $b_{15,7}$ | $b_{15,8}$ | $b_{15,9}$ | $b_{15,10}$ | $b_{15,11}$ | $b_{15,12}$ | $b_{15,13}$ | $b_{15,14}$ | $b_{15,15}$ |

| $g_{0,0}$ | $g_{0,1}$ | $g_{0,2}$ | $g_{0,3}$ | $g_{0,4}$ | $g_{0,5}$ | $g_{0,6}$ | $g_{0,7}$ | $g_{0,8}$ | $g_{0,9}$ | $g_{0,10}$ | $g_{0,11}$ | $g_{0,12}$ | $g_{0,13}$ | $g_{0,14}$ | $g_{0,15}$ |
|---|---|---|---|---|---|---|---|---|---|---|---|---|---|---|---|
| $g_{1,0}$ | $g_{1,1}$ | $g_{1,2}$ | $g_{1,3}$ | $g_{1,4}$ | $g_{1,5}$ | $g_{1,6}$ | $g_{1,7}$ | $g_{1,8}$ | $g_{1,9}$ | $g_{1,10}$ | $g_{1,11}$ | $g_{1,12}$ | $g_{1,13}$ | $g_{1,14}$ | $g_{1,15}$ |
| $g_{2,0}$ | $g_{2,1}$ | $g_{2,2}$ | $g_{2,3}$ | $g_{2,4}$ | $g_{2,5}$ | $g_{2,6}$ | $g_{2,7}$ | $g_{2,8}$ | $g_{2,9}$ | $g_{2,10}$ | $g_{2,11}$ | $g_{2,12}$ | $g_{2,13}$ | $g_{2,14}$ | $g_{2,15}$ |
| $g_{3,0}$ | $g_{3,1}$ | $g_{3,2}$ | $g_{3,3}$ | $g_{3,4}$ | $g_{3,5}$ | $g_{3,6}$ | $g_{3,7}$ | $g_{3,8}$ | $g_{3,9}$ | $g_{3,10}$ | $g_{3,11}$ | $g_{3,12}$ | $g_{3,13}$ | $g_{3,14}$ | $g_{3,15}$ |
| $g_{4,0}$ | $g_{4,1}$ | $g_{4,2}$ | $g_{4,3}$ | $g_{4,4}$ | $g_{4,5}$ | $g_{4,6}$ | $g_{4,7}$ | $g_{4,8}$ | $g_{4,9}$ | $g_{4,10}$ | $g_{4,11}$ | $g_{4,12}$ | $g_{4,13}$ | $g_{4,14}$ | $g_{4,15}$ |
| $g_{5,0}$ | $g_{5,1}$ | $g_{5,2}$ | $g_{5,3}$ | $g_{5,4}$ | $g_{5,5}$ | $g_{5,6}$ | $g_{5,7}$ | $g_{5,8}$ | $g_{5,9}$ | $g_{5,10}$ | $g_{5,11}$ | $g_{5,12}$ | $g_{5,13}$ | $g_{5,14}$ | $g_{5,15}$ |
| $g_{6,0}$ | $g_{6,1}$ | $g_{6,2}$ | $g_{6,3}$ | $g_{6,4}$ | $g_{6,5}$ | $g_{6,6}$ | $g_{6,7}$ | $g_{6,8}$ | $g_{6,9}$ | $g_{6,10}$ | $g_{6,11}$ | $g_{6,12}$ | $g_{6,13}$ | $g_{6,14}$ | $g_{6,15}$ |
| $g_{7,0}$ | $g_{7,1}$ | $g_{7,2}$ | $g_{7,3}$ | $g_{7,4}$ | $g_{7,5}$ | $g_{7,6}$ | $g_{7,7}$ | $g_{7,8}$ | $g_{7,9}$ | $g_{7,10}$ | $g_{7,11}$ | $g_{7,12}$ | $g_{7,13}$ | $g_{7,14}$ | $g_{7,15}$ |
| $g_{8,0}$ | $g_{8,1}$ | $g_{8,2}$ | $g_{8,3}$ | $g_{8,4}$ | $g_{8,5}$ | $g_{8,6}$ | $g_{8,7}$ | $g_{8,8}$ | $g_{8,9}$ | $g_{8,10}$ | $g_{8,11}$ | $g_{8,12}$ | $g_{8,13}$ | $g_{8,14}$ | $g_{8,15}$ |
| $g_{9,0}$ | $g_{9,1}$ | $g_{9,2}$ | $g_{9,3}$ | $g_{9,4}$ | $g_{9,5}$ | $g_{9,6}$ | $g_{9,7}$ | $g_{9,8}$ | $g_{9,9}$ | $g_{9,10}$ | $g_{9,11}$ | $g_{9,12}$ | $g_{9,13}$ | $g_{9,14}$ | $g_{9,15}$ |
| $g_{10,0}$ | $g_{10,1}$ | $g_{10,2}$ | $g_{10,3}$ | $g_{10,4}$ | $g_{10,5}$ | $g_{10,6}$ | $g_{10,7}$ | $g_{10,8}$ | $g_{10,9}$ | $g_{10,10}$ | $g_{10,11}$ | $g_{10,12}$ | $g_{10,13}$ | $g_{10,14}$ | $g_{10,15}$ |
| $g_{11,0}$ | $g_{11,1}$ | $g_{11,2}$ | $g_{11,3}$ | $g_{11,4}$ | $g_{11,5}$ | $g_{11,6}$ | $g_{11,7}$ | $g_{11,8}$ | $g_{11,9}$ | $g_{11,10}$ | $g_{11,11}$ | $g_{11,12}$ | $g_{11,13}$ | $g_{11,14}$ | $g_{11,15}$ |
| $g_{12,0}$ | $g_{12,1}$ | $g_{12,2}$ | $g_{12,3}$ | $g_{12,4}$ | $g_{12,5}$ | $g_{12,6}$ | $g_{12,7}$ | $g_{12,8}$ | $g_{12,9}$ | $g_{12,10}$ | $g_{12,11}$ | $g_{12,12}$ | $g_{12,13}$ | $g_{12,14}$ | $g_{12,15}$ |
| $g_{13,0}$ | $g_{13,1}$ | $g_{13,2}$ | $g_{13,3}$ | $g_{13,4}$ | $g_{13,5}$ | $g_{13,6}$ | $g_{13,7}$ | $g_{13,8}$ | $g_{13,9}$ | $g_{13,10}$ | $g_{13,11}$ | $g_{13,12}$ | $g_{13,13}$ | $g_{13,14}$ | $g_{13,15}$ |
| $g_{14,0}$ | $g_{14,1}$ | $g_{14,2}$ | $g_{14,3}$ | $g_{14,4}$ | $g_{14,5}$ | $g_{14,6}$ | $g_{14,7}$ | $g_{14,8}$ | $g_{14,9}$ | $g_{14,10}$ | $g_{14,11}$ | $g_{14,12}$ | $g_{14,13}$ | $g_{14,14}$ | $g_{14,15}$ |
| $g_{15,0}$ | $g_{15,1}$ | $g_{15,2}$ | $g_{15,3}$ | $g_{15,4}$ | $g_{15,5}$ | $g_{15,6}$ | $g_{15,7}$ | $g_{15,8}$ | $g_{15,9}$ | $g_{15,10}$ | $g_{15,11}$ | $g_{15,12}$ | $g_{15,13}$ | $g_{15,14}$ | $g_{15,15}$ |

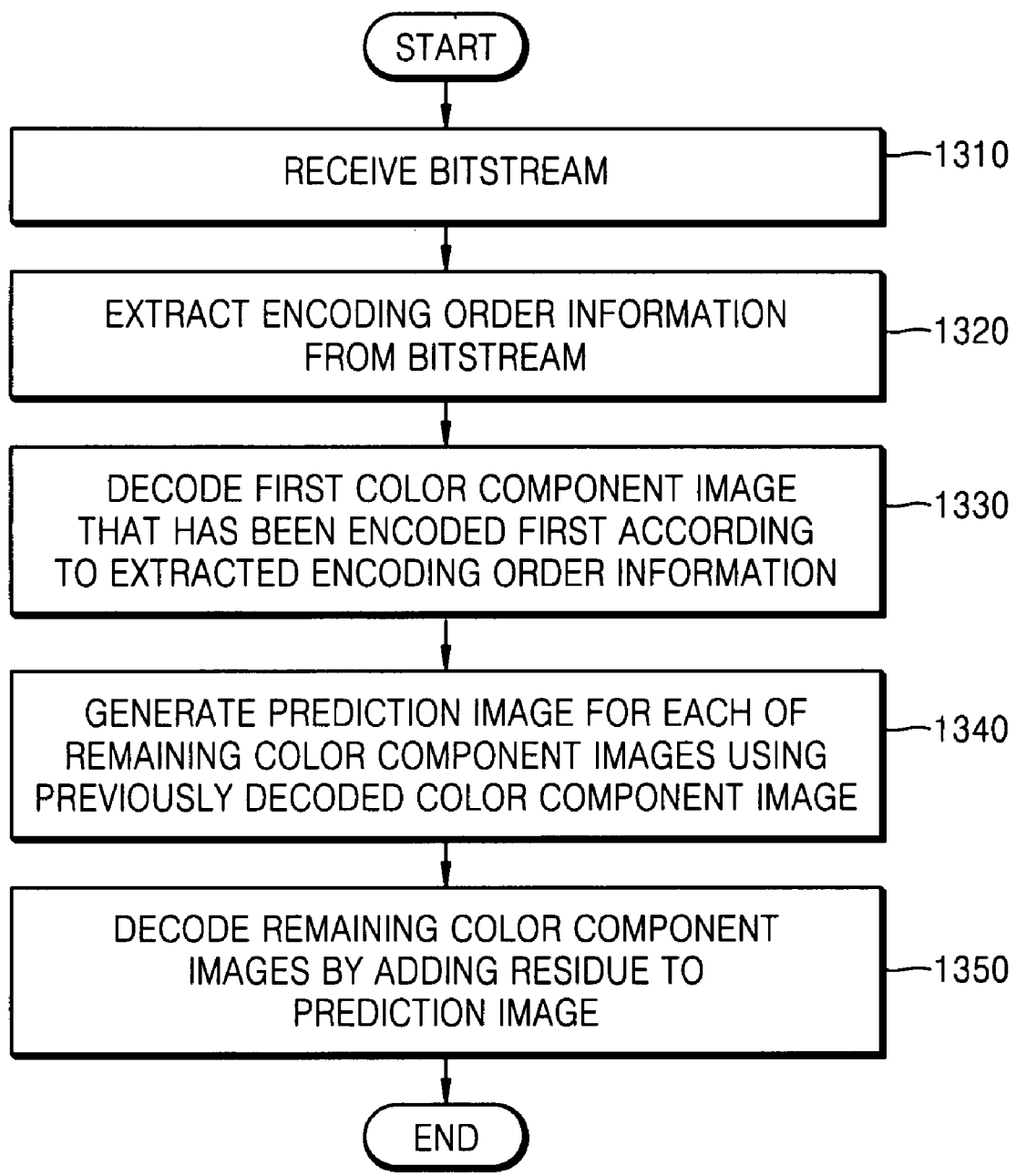

IMAGE ENCODING/DECODING METHOD AND APPARATUS

CROSS-REFERENCE TO RELATED PATENT APPLICATION

This application claims priority from Korean Patent Application No. 10-2006-0077122, filed on Aug. 16, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to image encoding and decoding, and more particularly, to image encoding and decoding, in which one of a plurality of color component images of an input image is predicted from a different color component image using a correlation between the color component images and the encoding order of the plurality of color component images is adaptively determined according to the characteristics of the input image.

2. Description of the Related Art

In general, when an image is captured, the captured original image is in a red, green, and blue (RGB) color format. To encode the RGB color format image, the RGB color format image is transformed into a YUV (or YCbCr) color format. Y is a black-white image and has a luminance component and U (or Cb) and V (or Cr) have color, components. Information is uniformly distributed over R, G, and B in an RGB image, but information is concentrated in Y and the amount of information in U (or Cb) and V (or Cr) is small in a YUV (or YCbCr) image. Thus, the YUV (or YCbCr) image can be compressed with high compression efficiency. To further improve compression efficiency, an YUV (or YCbCr) 4:2:0 image obtained by sampling color components U (or Cb) and V (or Cr) of an YUV (or YCbCr) image at a ratio of 1:4 is generally used.

However, since ¼ sampling of U (or Cb) and V (or Cr) in the YUV (or YCbCr) 4:2:0 image causes color distortion, it is not suitable for providing high display quality. Thus, a method for effectively encoding a YUV (or YCbCr) 4:4:4 image without sampling U (or Cb) and V (or Cr) is desired. Recently, residual color transform (RCT) which directly encodes an RGB 4:4:4 image to remove color distortion occurring in transformation of an RGB image to a YUV (or YCbCr) image has been suggested.

When an image like a YUV (or YCbCr) 4:4:4 image and an RGB 4:4:4 image in which color components have the same resolution is directly encoded using a related art encoding method, encoding efficiency is degraded. Thus, a method for improving encoding efficiency while maintaining high display quality by prediction based on the statistical characteristics of an image is desired for a case where a YUV (or YCbCr) 4:4:4 image is encoded or an RGB image is encoded in an RGB domain without being transformed to a YUV (or YCbCr) format.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an image encoding/decoding method and apparatus, in which when one of a plurality of RGB color component images forming an input RGB color format image is predicted from a different color component image using a correlation between the RGB color component images without transformation of the RGB color format image into another color format, the encoding order of the RGB color component images is determined in predetermined encoding units according to the characteristics of the RGB color format image, thereby improving encoding efficiency.

According to one aspect of the present invention, there is provided an image encoding method for encoding a plurality of color component images included in an input image. The image encoding method includes generating a prediction image for each of the remaining color component images following a first color component image that has been encoded first among the plurality of color component images, using a correlation with a previously encoded color, component image according to predetermined encoding orders, calculating prediction errors between the remaining color component images and the generated prediction images corresponding thereto in order to determine an encoding order corresponding to the smallest prediction error, and encoding the plurality of color component images according to the determined encoding order.

According to another aspect of the present invention, there is provided an image encoding method for encoding a plurality of color component images included in an input image. The image encoding method includes generating a prediction image for each of the remaining color component images following a first color component image that has been encoded first among the plurality of color component images, using a correlation with a previously encoded and reconstructed color component image according to predetermined encoding orders, summing the amount of bits generated when a residue of the firsts color component image is encoded and the amount of bits generated when a residue corresponding to a difference between each of the remaining color component images and the generated prediction image for each of the encoding orders, and comparing the summing results corresponding to the encoding orders to determine an encoding order corresponding to the smallest summing result.

According to another aspect of the present invention, there is provided an image encoding apparatus for encoding a plurality of color component images included in an input image. The image encoding apparatus includes an encoding order determination unit and, an encoding unit. The encoding order determination unit generates a prediction image for each of the remaining color component images following a first color component image that has been encoded first among the plurality of color component images, using a correlation with a previously encoded color component image according to predetermined encoding orders, calculates prediction errors between the remaining color component images and the generated prediction images corresponding thereto in order to determine an encoding order corresponding to the smallest prediction error. The encoding unit encodes the plurality of color component images according to the determined encoding order.

According to another aspect of the present invention, there is provided an image encoding apparatus for encoding a plurality of color component images included in an input image. The image encoding apparatus includes a correlation prediction unit and an encoding order determination unit. The correlation prediction unit generates a prediction image for each of the remaining color component images following a first color component image that has been encoded first among the plurality of color component images, using a correlation with a previously encoded and reconstructed color component image according to predetermined encoding orders. The encoding order determination unit sums the amount of bits generated when a residue of the firsts color component image is encoded and the amount of bits generated when a residue corresponding to a difference between each of the remaining color component images and the generated prediction image for each of the encoding orders and compares the summing results corresponding to the encoding orders to determine an encoding order corresponding to the smallest summing result.

According to another aspect of the present invention, there is provided an image decoding method for decoding a plurality of encoded color component images included in a bitstream. The image decoding method includes receiving a bitstream including the plurality of encoded color component images, extracting encoding order information for the plurality of color component images from the bitstream, generating prediction images for each of the remaining color component images following a first color component image that has been encoded first among the plurality of color component images using a correlation with a previously decoded color component image according to the extracted encoding order information, and adding residues of the remaining color component images included in the bitstream to the generated prediction images, thereby decoding the remaining color component images.

According to another aspect of the present invention, there is provided an image decoding apparatus for decoding a plurality of encoded color component images included in a bitstream. The image decoding apparatus includes a correlation prediction unit and an addition unit. The correlation prediction unit generates a prediction image for each of the remaining color component images following a first color component image that has been encoded first among the plurality of color component images, using a correlation with a previously encoded and reconstructed color component image according to encoding order information for the plurality of color component images extracted from the bitstream. The addition unit adds residues of the remaining color component images included in the bitstream to the generated prediction images, thereby decoding the remaining color component images.

BRIEF DESCRIPTION OF THE DRAWINGS

The above and other aspects of the present invention will become more apparent by describing in detail exemplary embodiments thereof with reference to the attached drawings in which:

FIG. 5A illustrates a 16×16 pixel block of a G color component image included in an input image;

FIG. 5B illustrates a 16×16 pixel block of a B color component image included in the input image;

FIG. 5C illustrates a 16×16 pixel block of a R color component image included in the input image;

FIG. 6A illustrates a 16×16 pixel block of a G color component image and pixel values of a neighbor pixel block of the 16×16 pixel block;

FIG. 6B illustrates a 16×16 pixel block of a B color component image and pixel values of a neighbor pixel block of the 16×16 pixel block;

FIG. 6C illustrates a 16×16 pixel block of a R color component image and pixel values of a neighbor pixel block of the 16×16 pixel block;

FIG. 7A illustrates an example in which a 16×16 pixel block of a G color component image is divided using a detected edge;

FIG. 7C illustrates an example in which a 16×16 pixel block of a R color component image is divided using a detected edge;

FIG. 8A illustrates a 16×16 pixel block of a G color component image divided using the detected edge and its neighbor pixel values;

FIG. 8B illustrates a 16×16 pixel block of a B color component image divided using the detected edge and its neighbor pixel values;

FIG. 8C illustrates a 16×16 pixel block of a R color component image divided using the detected edge and its neighbor pixel values;

FIG. 13 is a flowchart illustrating an image decoding method according to an exemplary embodiment of the present invention.

DETAILED DESCRIPTION OF EXEMPLARY EMBODIMENTS OF THE INVENTION

Hereinafter, exemplary embodiments of the present invention will be described in detail with reference to the accompanying drawings.

Figure 1A:
FIGS. 1A through 1C illustrate red (R) color component image, green (G) color component image, and a blue (B) color component image of a single color image.
Figure 1B:
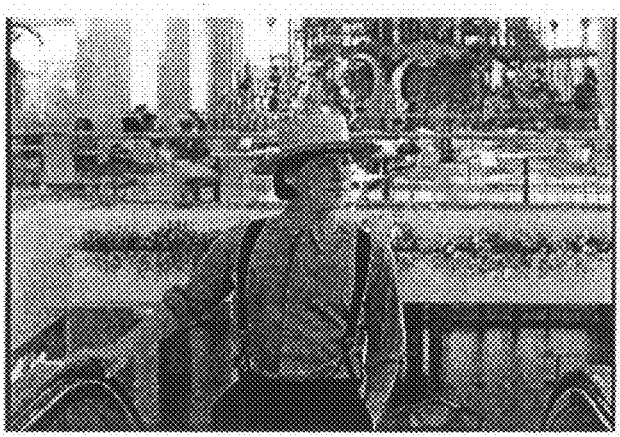
Figure 1C:
Figure 2A:
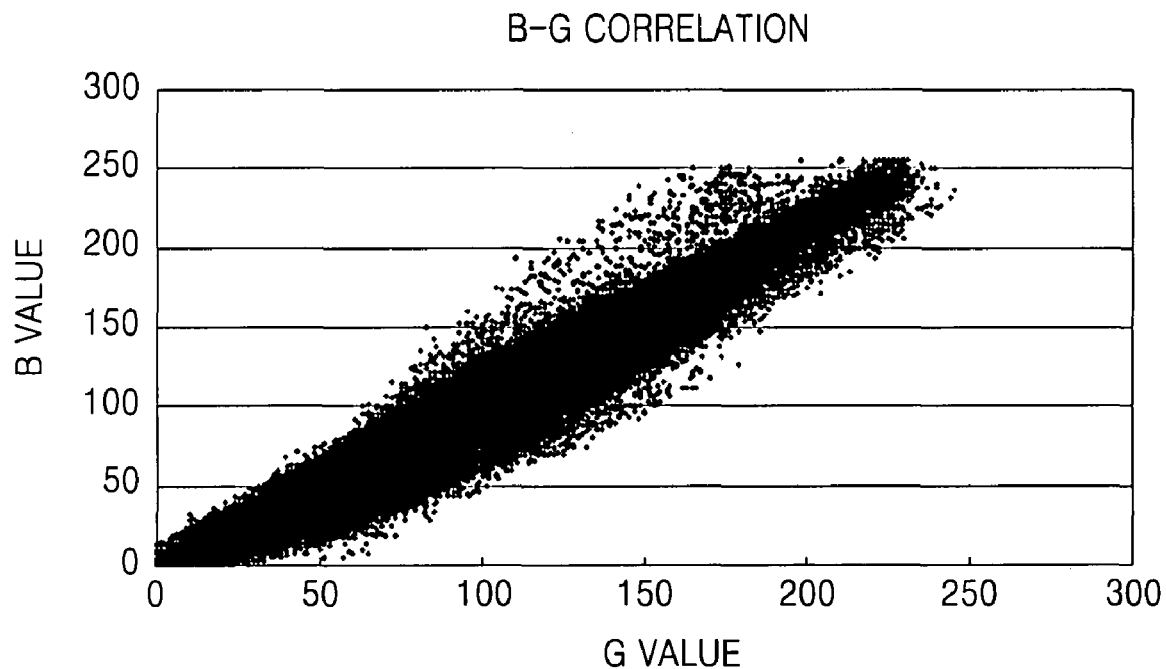
FIG. 2A is a graph showing correlation between the G color component image of FIG. 1B and the B color component image of FIG. 1C.
Figure 2B:
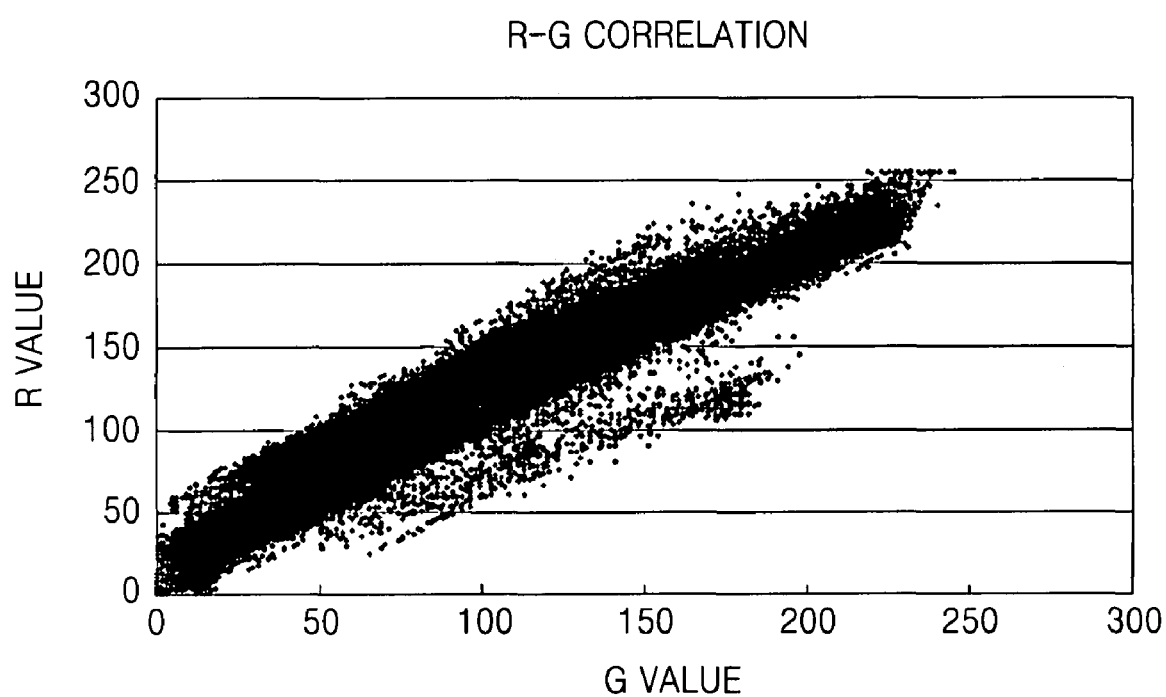
FIG. 2B is a graph showing correlation between the R color component image of FIG. 1A and the G color component image of FIG. 1B.

FIGS. 1A through 1C illustrate an R color component image, a G color component image, and a B color component image of a single color image, FIG. 2A is a graph showing correlation between the G color component image of FIG. 1B and the B color component image of FIG. 1C, and FIG. 2B is a graph showing correlation between the R color component image of FIG. 1A and the G color component image of FIG. 1B.

In general, when a color image is encoded, predictive encoding is performed on each of color component images to remove redundant information in each of color components. Referring to FIGS. 1A through 1C, pixels of RGB color component images of a single color image at the same position have similar pixel values, which can also be seen from graphs illustrated in FIGS. 2A and 2B.

Thus, according to the exemplary embodiments of the present invention, among a plurality of color component images forming an image, each of the remaining color component images following a first color component image that has been encoded first is predicted using its previous encoded color component image, based on a correlation between the plurality of color component images according to predetermined encoding orders in order to generate a prediction image, and the encoding order of the plurality of color component images is determined based on a prediction error corresponding to a difference between the generated prediction image and the original image and the amount of bits generated during encoding of a residue of each of the color component images.

Figure 3:
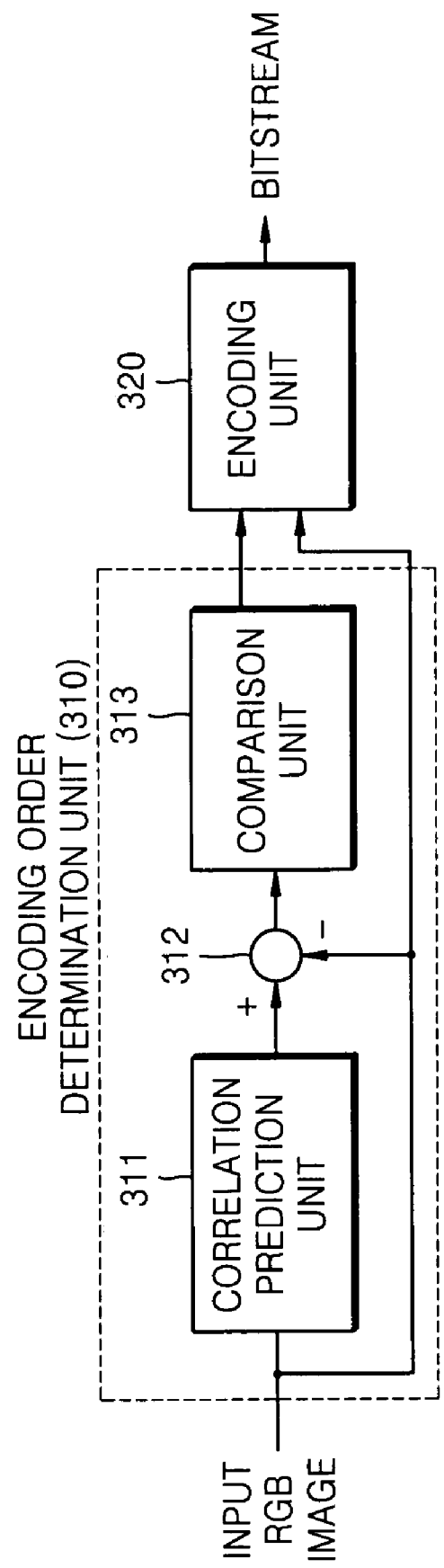
FIG. 3 is a block diagram of an image encoding apparatus according to an exemplary embodiment of the present invention.

FIG. 3 is a block diagram of an image encoding apparatus according to an exemplary embodiment of the present invention. For convenience of explanation, it is assumed that an input image includes three primary color images of RGB. However, the image encoding apparatus according to an exemplary embodiment of the present invention may also be applied to encoding of other color format images including a plurality of color component images without being limited to encoding of an RGB color format image.

Referring to FIG. 3, the image encoding apparatus includes an encoding order determination unit 310 and an encoding unit 320. The encoding order determination unit 310 includes a correlation prediction unit 311, a prediction error calculation unit 312, and a comparison unit 313.

To encode an input image including n color component images where n is an integer, $_nP_n$ encoding orders are available to encode the n color component images. For example, for an input image including three color component images of RGB as illustrated in FIGS. 1A through 1C, the color component images can be encoded according to $_3P_3$ encoding orders, i.e., a total of six encoding orders including GBR, GRB, BGR, BRG, RGB, and RBG.

The correlation prediction unit 311 generates a prediction image for each of the remaining color component images following a first color component image that has been encoded first using a color component image that has been encoded prior to each of the remaining color component images according to the available predetermined encoding orders. The generation of the prediction image will be described in more detail later.

The prediction error calculation unit 312 calculates a prediction error between the original image of each of, the remaining color component images and the prediction image thereof. The prediction error may be calculated using a sum of absolute differences (SAD) for pixel values of the original image and corresponding pixel values of the prediction image.

The comparison unit 313 compares prediction errors corresponding to the predetermined encoding orders in order to determine an encoding order corresponding to the smallest prediction error.

The encoding unit 320 encodes each of the color component images according to the determined encoding order in order to generate a bitstream. The encoding unit 320 may be an encoder that complies with the H.264 or Moving Picture Experts Group (MPEG) standard. The encoding unit 320 inserts information about the determined encoding order and information about which previously encoded color component image has been referred to by each of the remaining color component images into a header of the bitstream in order to allow a decoder to sequentially decode the bitstream.

Figure 4:
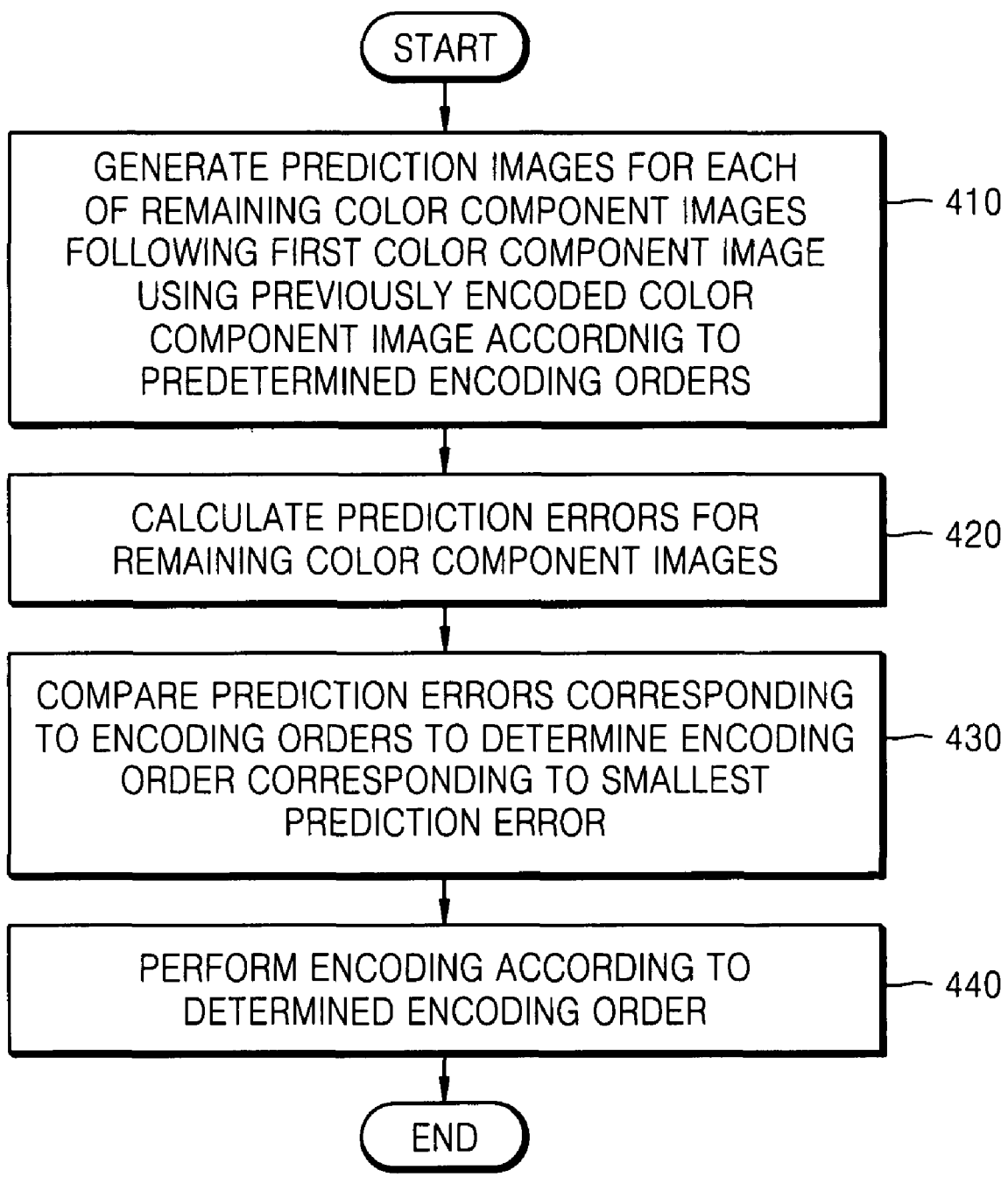
FIG. 4 is a flowchart illustrating an image encoding method according to an exemplary embodiment of the present invention.

FIG. 4 is a flowchart illustrating an image encoding method according to an exemplary embodiment of the present invention.

In operation 410, the correlation prediction unit 311 generates prediction images for each of the remaining color component images following a first color component image that has been encoded first, using a correlation between each of the remaining color component images and its previous encoded color component image in predetermined encoding orders that are available according to the number of a plurality of color component images included in an input image. Hereinafter, a process in which the correlation prediction unit 311 according to the exemplary embodiment of the present invention generates prediction images for each of the remaining color component images will be described in detail with reference to FIGS. 5A through 8C. For convenience of explanation, the following description will be focused on a case where encoding is performed in the order of a G color component image, then a B color component image, and then a R color component image among the plurality of available encoding orders.

FIG. 5A illustrates a 16×16 pixel block 510 of a G color component image included in an input image, FIG. 5B illustrates a 16×16 pixel block 520 of a B color component image included in the input image, and FIG. 5C illustrates a 16×16 pixel block 530 of an R color component image included in the input image. The values $g_{i,j}$, $b_{i,j}$, and $r_{i,j}$ indicate pixel values in an $i^{th}$ row and a $j^{th}$ column of a 16×16 pixel block of each of the G, B, and R color component images.

When the G color component image, the B color component image, and the R color component image are sequentially encoded, the correlation prediction unit 311 generates a prediction image for the B color component image using the G color component image that has been encoded first as a reference image. The correlation prediction unit 311 generates prediction images for the R color component image using previous encoded color component images, i.e., the G color component image or the B color component image, and determines a prediction image having a smaller prediction error as a final prediction image for the R color component image. For example, a process of generating the prediction image for the R color component image using the G color component image will be described.

If a pixel value of a pixel in an $i^{th}$ row and a $j^{th}$ column of a 16×16 pixel block of the G color component image is $g_{i,j}$ and a prediction value, which corresponds to $g_{i,j}$, of a pixel in an $i^{th}$ row and a $i^{th}$ column of a pixel block of the B color component image is $\overline{b}_{i,j}$, a predetermined weight indicating a correlation between the G color component image and the B color component image is a, and a predetermined offset value is b, the correlation prediction unit 311 models a correlation between pixel values of the G color component image and pixel values of the B color component image as a first order function in order to predict the pixel values of the B color component image corresponding to the pixel values of the G color component image as follows:

$$\overline{b}_{ij} = a \times g_{ij} + b \qquad (1)$$

Prediction pixel values obtained by Equation 1 are clipped to integers between 0 and 255 when a pixel value of an image is expressed in eight bits. The values a and b in Equation 1 may change according to the position (i, j) of a pixel, but they are assumed to be constant within a predetermined block in the current exemplary embodiment of the present invention. For example, a and b are determined as values that minimize a sum of differences Sum of diff($r_B$) between the original pixel values $b_{i,j}$ of a 16×16 pixel block of the B color component image and the prediction pixel values of the B color component image predicted using Equation 1 as follows:

$$\text{Sum of } \mathit{diff}(r_B) = \sum_{i,j=0}^{15} |b_{i,j} - (a \cdot g_{i,j} + b)|^p, \quad (2)$$

where p is an integer that is greater than 1. Alternatively, to determine a and b in Equation 1, a may be determined as 1 and b may be determined as the average of differences between the original pixel values $b_{i,j}$ of a 16×16 pixel block of the B color component image and pixel values $g_{i,j}$ of a pixel block of the G color component image as follows:

$$b = \frac{\sum_{i=0}^{15}\sum_{j=0}^{15}(b_{i,j} - g_{i,j})}{256} \quad (3)$$

Once the constants a and b in Equation 1 are determined, the correlation prediction unit 311 substitutes pixel values $g_{i,j}$ of a pixel block of the G color component image into Equation 1 in order to predict corresponding pixel values of a pixel block of the B color component image.

Alternatively, to determine a and b in Equation 2, a linear regression model based method that is widely used in the field of statistics may be used.

Like prediction of the B color component image from the G color component image, the R color component image may be predicted using its previous encoded color component image, i.e., the G color component image or the B color component image. One of the G color component image and the B color component image, which causes a smaller prediction error, is determined as a final reference image for the R color component image. In this case, an encoded bitstream has to include information about which one of the G color component image and the B color component image has been referred to by the R color component image.

Although the constants a and b in Equation 1 are determined using pixel values of the current pixel block in the generation of the prediction image described above, they may be determined using pixel values of a neighbor pixel block processed prior to the current pixel block, instead of the pixel values of the current pixel block.

Figure 6C:
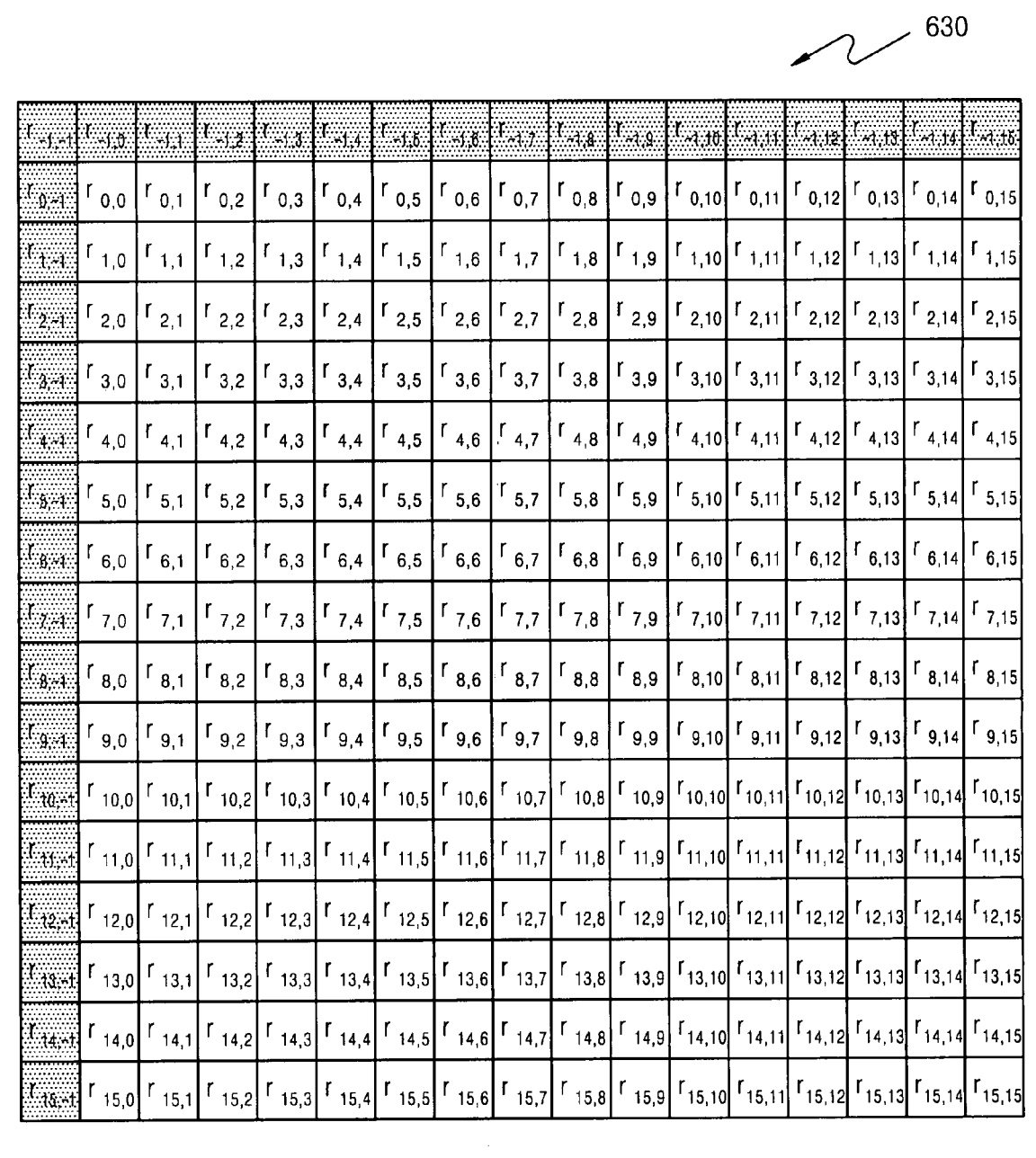

FIG. 6A illustrates a 16×16 pixel block 610 of a G color component image included in an image and pixel values of a neighbor pixel block of the 16×16 pixel block 610, FIG. 6B illustrates a 16×16 pixel block 620 of a B color component image included in an image and pixel values of a neighbor pixel block of the 16×16 pixel block 620, and FIG. 6C illustrates a 16×16 pixel block 630 of a R color component image included in an image and pixel values of a neighbor pixel block of the 16×16 pixel block 630. In FIGS. 6A through 6C, hatched pixels indicate pixels of a neighbor pixel block processed prior to the current pixel block.

When the G color component image, the B color component image, and the R color component image are sequentially encoded, the constants a and b in Equation 1 for generating a prediction image for the B color component image may be determined as values that minimize differences between prediction pixel values of a neighbor pixel block of the B color component image predicted using pixel values of a neighbor pixel block of the G color component image and pixel values of a neighbor pixel block of the B color component image. In other words, the constants a and b may be determined as values that minimize a sum of differences between pixel values $b_{i,j}$ of a neighbor pixel block of the B color component image and corresponding prediction pixel values $\overline{b}_{i,j}$ of the neighbor pixel block of the B color component image predicted using Equation 1 as follows:

$$(a, b) = \arg\min_{a,b}\sum_{i=0}^{15}|b_{-1,j} - (a \cdot g_{-1,j} + b)| + \sum_{j=1}^{15}|b_{j,-1} - (a \cdot g_{j,-1} + b)| \quad (4)$$

To determine a and b in Equation 4, a may be determined as 1 and b may be determined as the average of differences between pixel values of a neighbor pixel block of the B color component image and pixel values of a neighbor pixel block of the G color component image as follows:

$$b = \frac{\sum_{i=0}^{15}(b_{-1,i} - g_{-1,i}) + \sum_{j=0}^{15}(b_{j,-1} - g_{j,-1})}{32} \quad (5)$$

Once a and b in Equation 1 are determined, the correlation prediction unit 311 substitutes pixel values $g_{i,j}$ of a pixel block of the G color component image into Equation 1 in order to predict corresponding pixel values of a pixel block of the B color component image.

The correlation prediction unit 311 may also detect an edge in an input image, divide the input image using the detected edge, and generate a prediction image using predictors having a and b of different values for areas obtained by dividing the input image. For edge detection, various edge detection algorithms such as a sobel operator and a canny edge detection algorithm may be used.

Figure 7B:
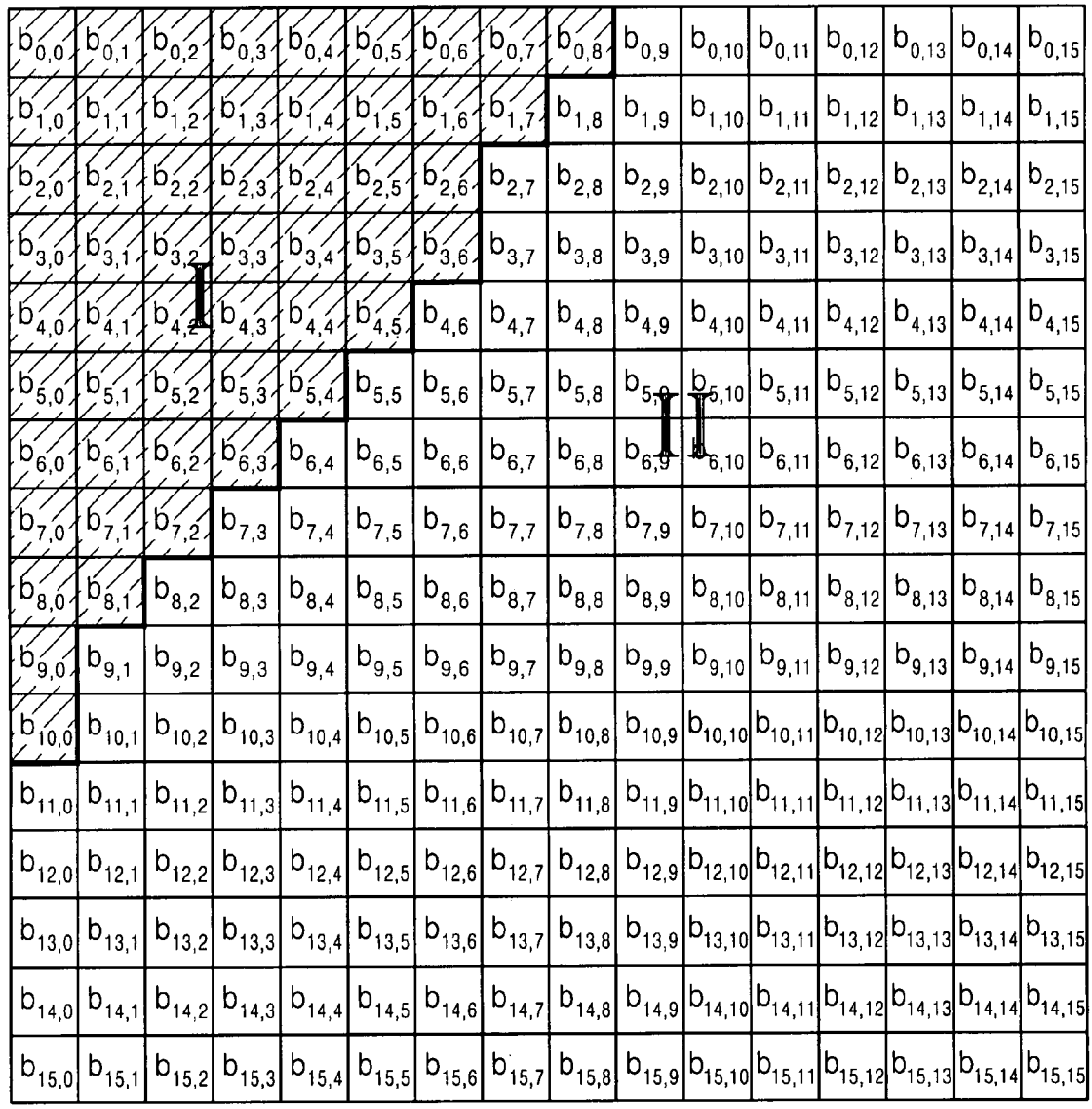
FIG. 7B illustrates an example in which a 16×16 pixel block of a B color component image is divided using a detected edge.
Figure 7C:
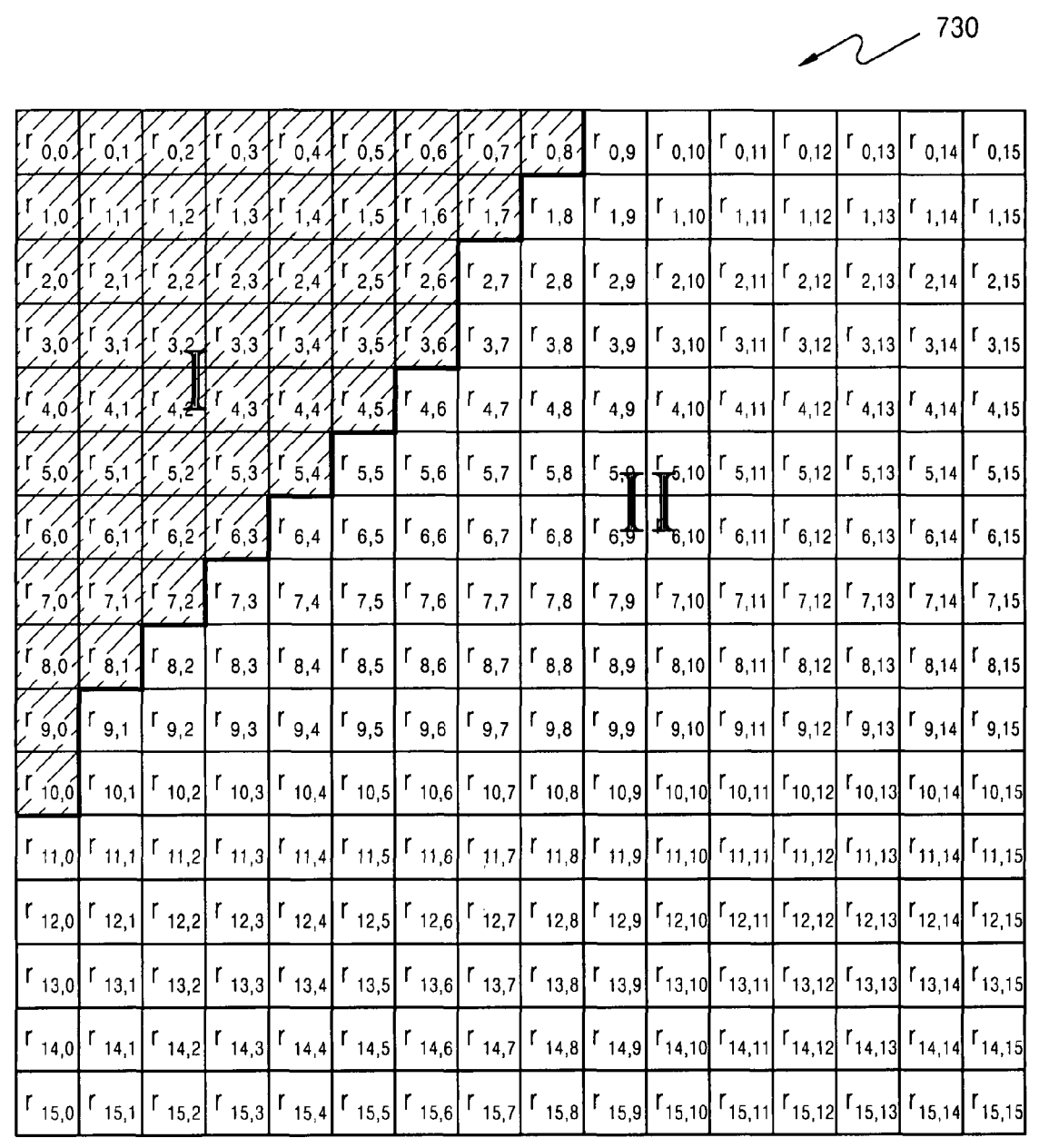

FIG. 7A illustrates an example in which a 16×16 pixel block 710 of a G color component image is divided using a detected edge, FIG. 7B illustrates an example in which a 16×16 pixel block 720 of a B color component image is divided using a detected edge, and FIG. 7C illustrates an example in which a 16×16 pixel block 730 of a R color component image is divided using a detected edge. Referring to FIGS. 7A through 7C, if edge exists in the pixel block 710 of the G color component image that is encoded first, the correlation prediction unit 311 determines that the same edge exists in the pixel block 720 of the B color component image and the pixel block 730 of the R color component image and divides each of the pixel block 710 of the G color component image, the pixel block 720 of the B color component image, and the pixel block 730 of the R color component image into two areas I and II using the detected edge.

The correlation prediction unit 311 predicts pixel values for each of the areas I and II of the pixel block 720 of the B color component image and pixel values for each of the areas I and II of the pixel block 730 of the R color component image using pixel values in each of the areas I and II of the pixel block 710 of the G color component image. In other words, the correlation prediction unit 311 predicts pixel values for the first area I of the pixel block 720 of the B color component image and pixel values for the first area I of the pixel block 730 of the R color component image using pixel values $g_{i,j}$ in the first area I of the pixel block 710 of the G color component image. Similarly, the correlation prediction unit 311 predicts pixel values for the second area II of the pixel block 720 of the B color component image and pixel values for the second area II of the pixel block 730 of the R color component image using pixel values $g_{i,j}$ in the second area II of the pixel block 710 of the G color component image.

More specifically, if a pixel block of each color component image is divided into n areas, a pixel value in a $k^{th}$ area (k=1, 2, ..., n) of a pixel block of the G color component image is $$g_{(k)i,j},$$

a prediction pixel value, which corresponds to $$g_{(k)i,j},$$

of a pixel in a $k^{th}$ area of a pixel block of the B color component image, is $$\overline{b_{(k)i,j}},$$

a predetermined weight indicating a correlation between the $k^{th}$ area of the G color component image and the $k^{th}$ area of the B color component is e, and a predetermined offset value is f, pixel values of a pixel block of the B color component image can be predicted like Equation 1 as follows:

$$\overline{b_{(k)i,j}} = e \times g_{(k)i,j} + f \quad (6)$$

where the constants e and f may be determined as values that minimize differences between prediction pixel values for each of the first area I and the second area II in a pixel block of the B component color image and corresponding original pixel values, or e may be fixed to 1 and f may be determined by calculating the average of differences between the original pixel values of a pixel block of the B color component image and corresponding pixel values of a pixel block of the G color component image.

Like prediction of pixel values for each of the first area I and the second area II in a pixel block of the B color component image, pixel values for each of the first area I and the second area II in a pixel block of the R color component image may be predicted using the G color component image or the B color component image.

A predictor in Equation 6 used in prediction of pixel values of a pixel block of each of the remaining color component images using the detected edge may be determined using pixel values of a neighbor pixel block of the pixel block of each of the remaining color component images.

Figure 8A:
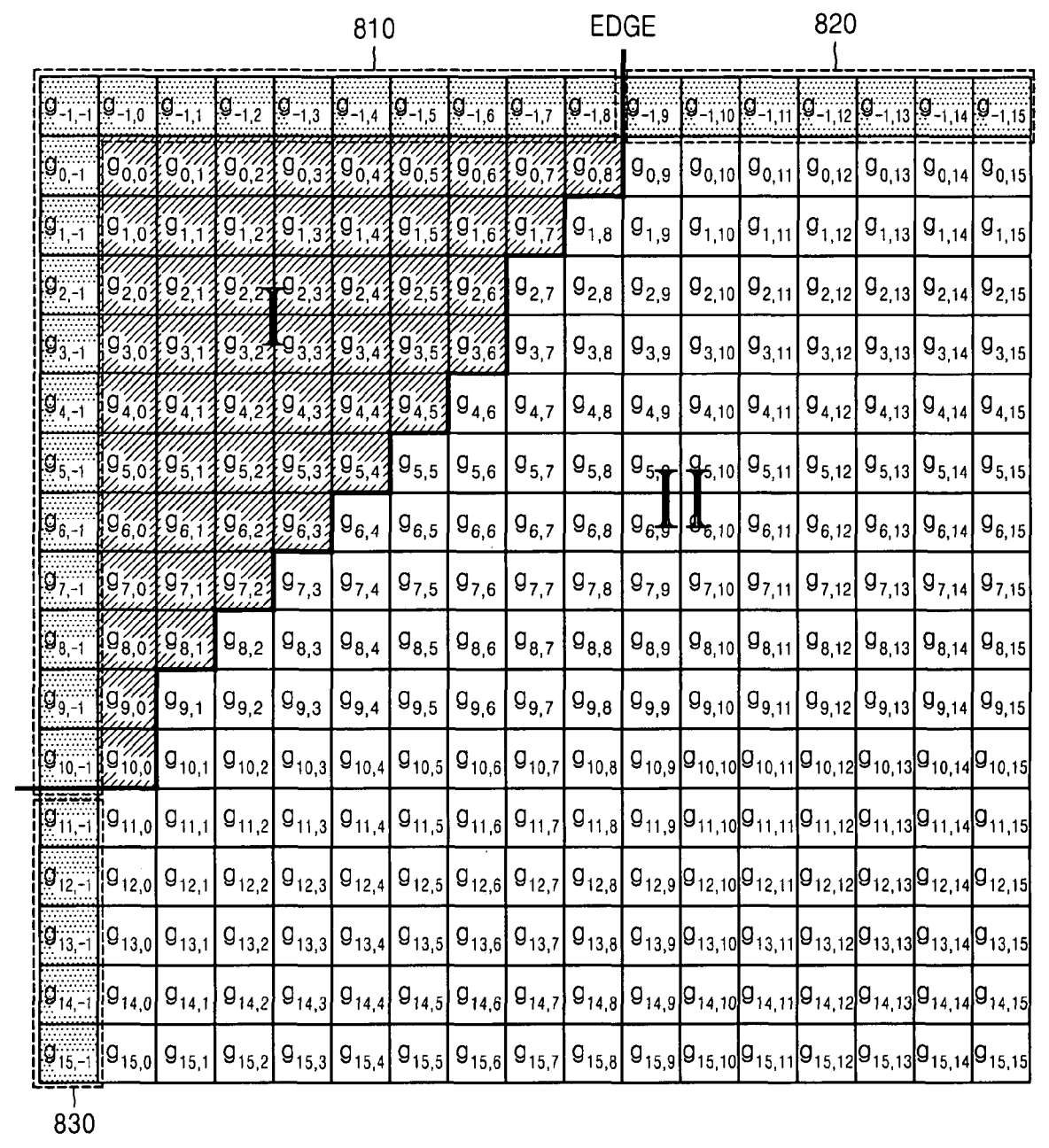
Figure 8B:
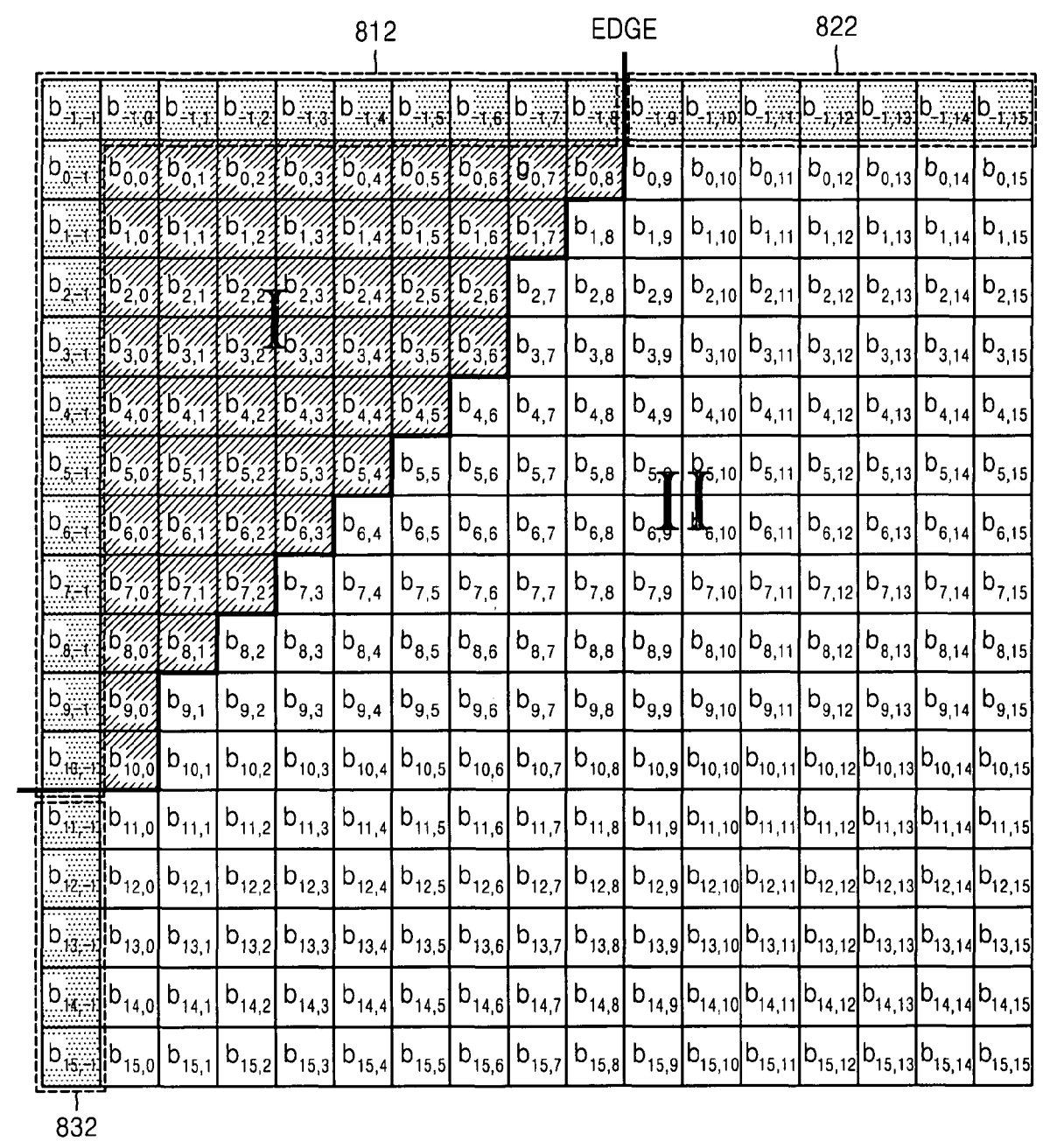
Figure 8C:
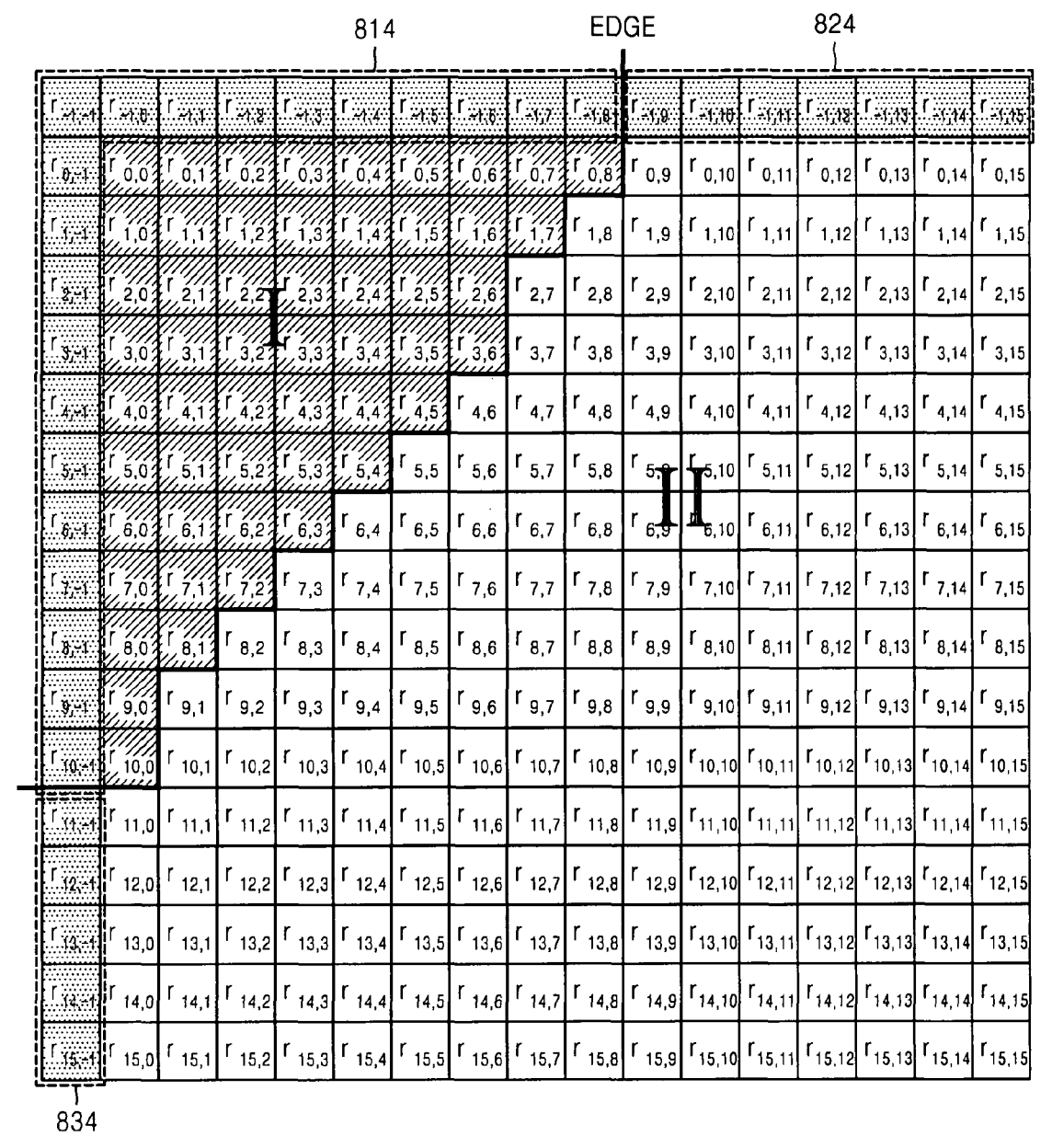

FIG. 8A illustrates a pixel block of a G color component image divided using a detected edge and its neighbor pixel values of the pixel block, FIG. 8B illustrates a pixel block of a B color component image divided using a detected edge and its neighbor pixel values of the pixel block, and FIG. 8C illustrates a pixel block of a R color component image divided using a detected edge and its neighbor pixel values of the pixel block.

The correlation prediction unit 311 may determine constants e and f in Equation 6 using pixel values of a neighbor pixel block of the current pixel block using a detected edge. In other words, in Equation 6, the constants e and f may be determined as values that minimize differences between prediction pixel values of a neighbor pixel block of the B color component image adjacent to a $k^{th}$ area of a pixel block of the B color component image predicted using pixel values of a neighbor pixel block of the G color component image and reconstructed pixel values of the neighbor pixel block of the B color component image adjacent to the $k^{th}$ area of the pixel block of the B color component image.

For example, e may be determined as 1 and f may be determined using the average of differences between pixel values of a neighbor pixel block of the B color component image adjacent to the $k^{th}$ area of the pixel block of the B color component image and pixel values of a neighbor pixel block of the G color component image adjacent to the $k^{th}$ area of the pixel block of the B color component image. Referring to FIGS. 8A and 8B, f of Equation 6 to be applied to the first area I can be defined using pixel values of pixels 810 of a neighbor pixel block of the G color component image adjacent to the first area I of the current pixel block and pixel values of corresponding pixels 812 of a neighbor pixel block of the B color component image, as follows:

$$f = \frac{\sum_{i=-1}^{8}(b_{-1,i} - g_{-1,i}) + \sum_{j=0}^{10}(b_{j,-1} - g_{j,-1})}{21}. \quad (7)$$

Similarly, f of Equation 6 to be applied to the second area II can be defined using pixel values of pixels 820 and 830 of a neighbor pixel block of the G color component image adjacent to the second area II of the current pixel block and pixel values of corresponding pixels 822 and 832 of a neighbor pixel block of the B color component image, as follows:

$$f = \frac{\sum_{i=9}^{15}(b_{-1,i} - g_{-1,i}) + \sum_{j=11}^{15}(b_{j,-1} - g_{j,-1})}{12} \quad (8)$$

Like prediction of pixel values for each of the first area I and the second area II of a pixel block of the B color component image, pixel values for each of the first area I and the second area II of a pixel block of the R color component image can also be predicted using the previously encoded G color component image and B color component image.

In brief, the correlation prediction unit 311 generates a predictor like Equation 1 using pixel blocks of the current pixel block or its neighbor pixel block and substitutes pixel values of the previously processed color component image into the predictor in order to generate prediction images for each of the remaining color component images. The correlation prediction unit 311 also detects an edge in an image, generates an independent predictor for each of the first area I and the second area II divided by the detected edge, and substitutes pixel values of a previously processed color component into the predictor, thereby generating a prediction image for each of the remaining color component images. The correlation prediction unit 311 also generates a prediction image for each of the remaining color component images according to the remaining 5 available encoding orders as well as the aforementioned GBR order.

Referring back to FIG. 4, in operation 420, the prediction error calculation unit 312 calculates differences between prediction images of the remaining color component images, which are generated according to the available encoding orders, and the original images of the remaining color component images in order to calculate prediction errors.

In operation 430, the comparison unit 313 compares the calculated prediction errors in order to determine an encoding order having the smallest prediction error. The comparison unit may calculate a prediction error in units of one selected from a macroblock, a slice, a picture, a group of pictures (GOP), and a scene change and determine an encoding order corresponding to the smallest prediction error for each selected unit. In other words, the image encoding apparatus according to the exemplary embodiments of the present invention may apply different encoding orders to a macroblock unit, a slice unit, a GOP unit, and a scene change unit in order to encode the color component images.

In operation 440, the encoding unit 320 sequentially encodes the remaining color component images according to the determined encoding order. When the encoding unit 320 encodes the remaining color component images, the encoding unit 320 generates a bitstream by performing transformation, quantization, and entropy-encoding on a residue corresponding to a difference between a prediction image for each of the remaining color component image, which is predicted by the correlation prediction unit 311, and the original image of each of the remaining color component image. The encoding unit 320 may insert information about the determined encoding order and information about which previously encoded color component image has been referred to by each of the remaining color component images into a header of an encoded bitstream.

Figure 9A:
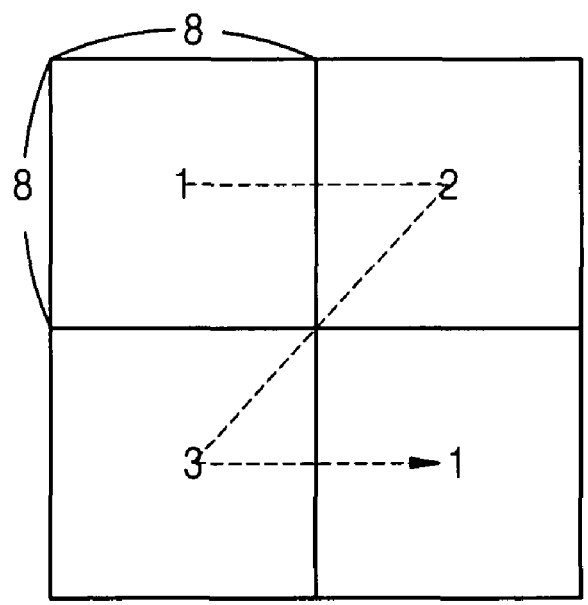
FIG. 9A illustrates the processing order of 8×8 pixel blocks in an image encoding method and apparatus according to the present invention.
Figure 9B:
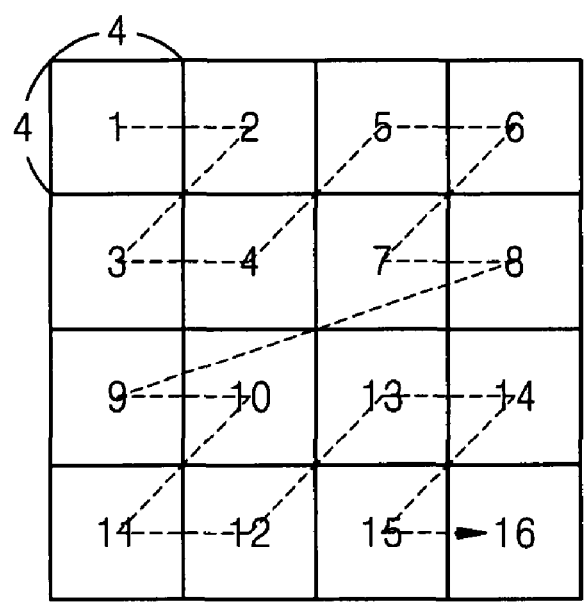
FIG. 9B illustrates the processing order of 4×4 pixel blocks in an image encoding method and apparatus according to the present invention.

FIG. 9A illustrates the processing order of 8×8 pixel blocks in the image encoding method and apparatus according to an exemplary embodiment of the present invention, and FIG. 9B illustrates the processing order of 4×4 pixel blocks in the image encoding method and apparatus according to the exemplary embodiment of the present invention.

Referring to FIG. 9A, when a pixel block of the B color component image is processed in an 8×8 mode, four 8×8 pixel blocks of the B color component image are sequentially predicted left-to-right and top-to-bottom. Pixel values of the 8×8 pixel blocks of the B color component image are predicted using Equation 1 in the similar manner to above-described prediction of pixel values of a 16×16 pixel block of the B color component image.

Referring to FIG. 9B, when a pixel block of the B color component image is processed in a 4×4 mode, sixteen 4×4 pixel blocks of the B color component image are sequentially predicted left-to-right and top-to-bottom. Pixel values of the 4×4 pixel blocks of the B color component image can be predicted using Equation 1 in the similar manner to above-described prediction of pixel values of a 16×16 pixel block or 8×8 pixel block of the B color component image.

Correlation prediction may be performed in units of a macroblock (16×16), a 16×16 block, an 8×8 block, or a 4×4 block. As an adaptive exemplary embodiment, correlation prediction for each macroblock may be performed in units of one of the three block modes.

Figure 10:
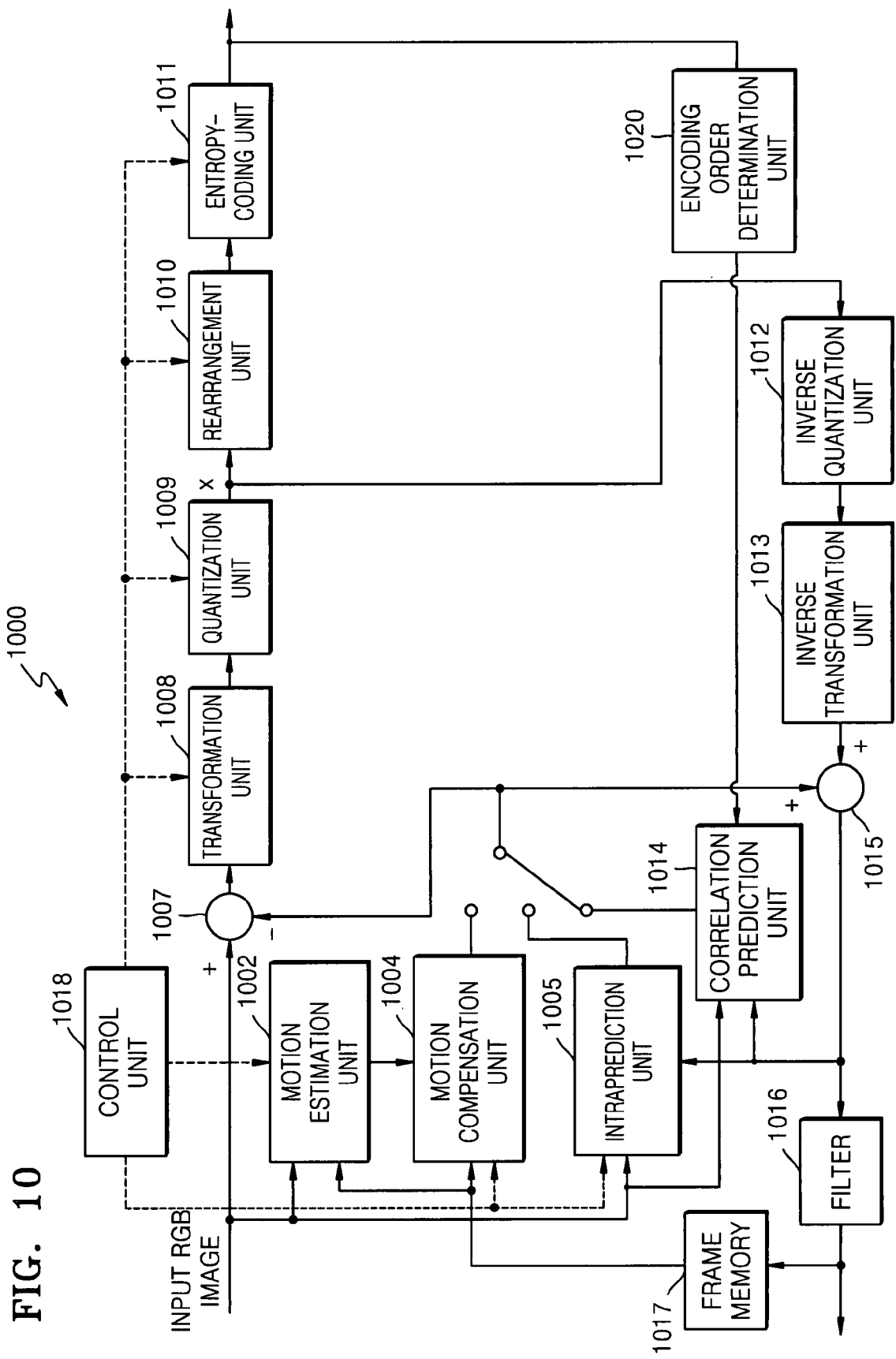
FIG. 10 is a block diagram of an image encoding apparatus according to another exemplary embodiment of the present invention.

FIG. 10 is a block diagram of an image encoding apparatus 1000 according to another exemplary embodiment of the present invention.

The image encoding apparatus 1000 according to another exemplary embodiment of the present invention is similar to the image encoding apparatus according to an exemplary embodiment of the present invention in that a prediction image is generated using a correlation between a plurality of color component images included in an input image, but is different from the image encoding apparatus according to an exemplary embodiment of the present invention in that a prediction image is generated using a previously encoded and then reconstructed image.

Referring to FIG. 10, the image encoding apparatus 1000 includes a motion estimation unit 1002, a motion compensation unit 1004, an intraprediction unit 1006, a subtraction unit 1007, a transformation unit 1008, a quantization unit 1009, a rearrangement unit 1010, an entropy-coding unit 1011, an inverse quantization unit 1012, an inverse transformation unit 1013, a correlation prediction unit 1014, an addition unit 1015, a filter 1016, a frame memory 1017, a control unit 1018, and an encoding order determination unit 1020.

The motion estimation unit 1002 and the motion compensation unit 1004 perform interprediction in which a prediction value of the current pixel block of each color component image is searched for in a preceding or following reference picture. The intraprediction unit 1006 performs intraprediction in which the prediction value of the current pixel block of each color component image is searched for in the current picture.

The subtraction unit 1007 generates a first residue by subtracting a prediction pixel block predicted by interprediction or intraprediction from a pixel block of a first color component image that has been encoded first according to predetermined encoding orders. The generated first residue is transformed into a frequency domain by the transformation unit 1008 and is quantized by the quantization unit 1009. Transformation coefficients of the quantized first residue are rearranged by the rearrangement unit 1010 and then encoded by the entropy-coding unit 1014 to be output in the form of a bitstream.

The transformed and quantized first residue is inversely quantized by the inverse quantization unit 1012 and is inversely transformed by the inverse transformation unit 1013. The addition unit 1015 adds the inversely quantized and inversely transformed first residue to the prediction pixel block of the first color component image, thereby reconstructing the pixel block of the first color component image. The reconstructed first color component image passes through the filter 1016 that performs deblocking filtering and is stored in the frame memory 1017 to be used for interprediction of a next picture. The reconstructed pixel block of the first color component image is input to the intraprediction unit 1006 to be used as a reference value for intraprediction of a next pixel block. The reconstructed pixel block of the first color component image is also input to the correlation prediction unit 1014 for prediction of pixel blocks of the remaining color component images except for the first color component image.

The correlation prediction unit 1014 generates a prediction image for corresponding another color component image from a previous color component image that has been encoded according to the predetermined encoding orders and then reconstructed using a correlation between the plurality of color component images included in a color image. The correlation prediction unit 1014 generates a prediction image for the remaining color component image using pixel values of the current pixel block that has been encoded and then reconstructed in the similar manner to the exemplary embodiment of the present invention described above. In other words, a predictor is generated using pixel values of each color component image included in the input image in the exemplary embodiment of the present invention, but a predictor is generated using a previously encoded and reconstructed color component image in another exemplary embodiment of the present invention.

The subtraction unit 1007 subtracts pixel blocks of the original color component images from prediction pixel blocks of the remaining color component images predicted by the correlation prediction unit 1014, thereby generating a second residue and a third residue. Like the first residue, the second residue and the third residue are encoded by transformation, quantization, and entropy-coding and are output in the form of a bitstream.

The control unit 1018 controls components of the image encoding apparatus 1000 and determines a prediction mode for the current pixel block. More specifically, the control unit 1018 calculates the costs of an interpredicted image, an intrapredicted image, and an image predicted using a correlation between color component images according to an exemplary embodiment of the present invention and determines a prediction mode having the smallest cost as a final prediction mode. The control unit 1018 may select related art interprediction or intraprediction for encoding each of the color component images instead of predictive encoding according to an exemplary embodiment of the present invention if a cost of a predicted image according to an exemplary embodiment of the present invention is greater than a predetermined threshold.

The control unit 1018 also calculates a reference value indicating a correlation between color component images and may select related art interprediction or intraprediction for encoding each of the color component images instead of predictive encoding according to an exemplary embodiment of the present invention if the reference value is less than a predetermined threshold. Here, the reference value may be a dispersion value or a standard deviation indicating the degree of dispersion between color component images.

Prediction mode information is inserted into a header of a bitstream of an image encoded by the image encoding method according to an exemplary embodiment of the present invention to perform decoding based on a correlation between color component images according to an exemplary embodiment of the present invention.

The encoding order determination unit 1020 calculates a sum of the amounts of bits generated when the first residue, the second residue, and the third residue of the color component images are encoded according to each of the encoding orders, compares the sums of the amounts of generated bits according to the encoding orders, and determines an encoding order corresponding to the smallest amount of generated bits. The encoding order determination unit 1020 calculates the amount of generated bits in units of one selected from a macroblock, a slice, a picture, a GOP, and a scene change to change an encoding order for each selected unit. The encoding order determination unit 1020 may also determine an encoding order having the minimize rate-distortion cost based on the amount of generated bits according to each of the encoding orders and a prediction error.

Figure 11:
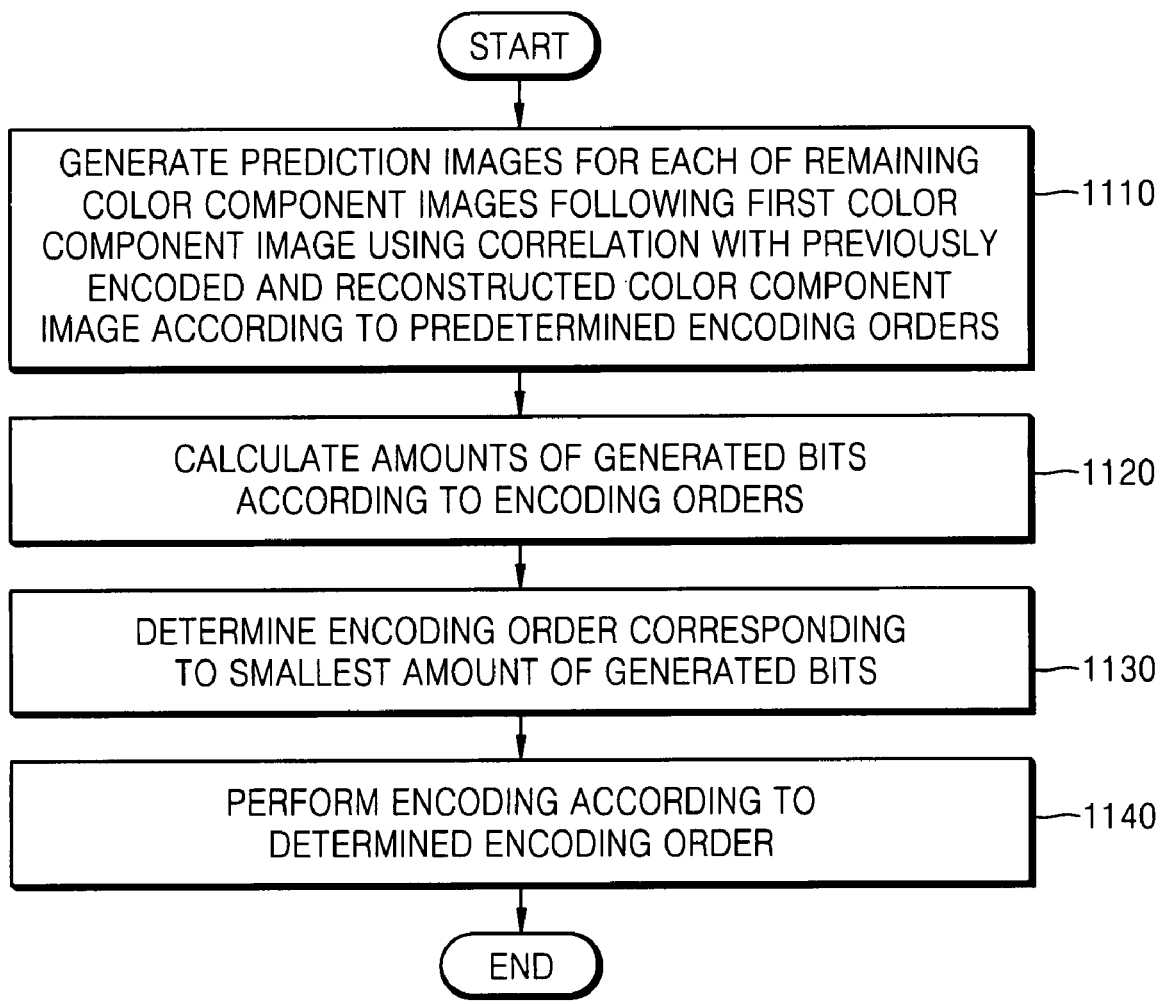
FIG. 11 is a flowchart illustrating an image encoding method according to another exemplary embodiment of the present invention.

FIG. 11 is a flowchart illustrating an image encoding method according to another exemplary embodiment of the present invention.

Referring to FIG. 11, in operation 1110, a prediction image for each of the remaining color component images following a first color component image that has been encoded first are generated using a correlation with a previously encoded and reconstructed color component image according to predetermined encoding orders.

In operation 1120, the amount of bits generated when the first color component image is encoded and the amount of bits generated when a residue corresponding to a difference between each of the remaining color component images and a prediction image thereof is encoded are summed for each encoding order.

In operation 1130, the amounts of generated bits according to the encoding orders are compared to determine an encoding order corresponding to the smallest amount of generated bits.

In operation 1140, the plurality of color component images included in the input image are sequentially encoded according to the determined encoding order.

Figure 12:
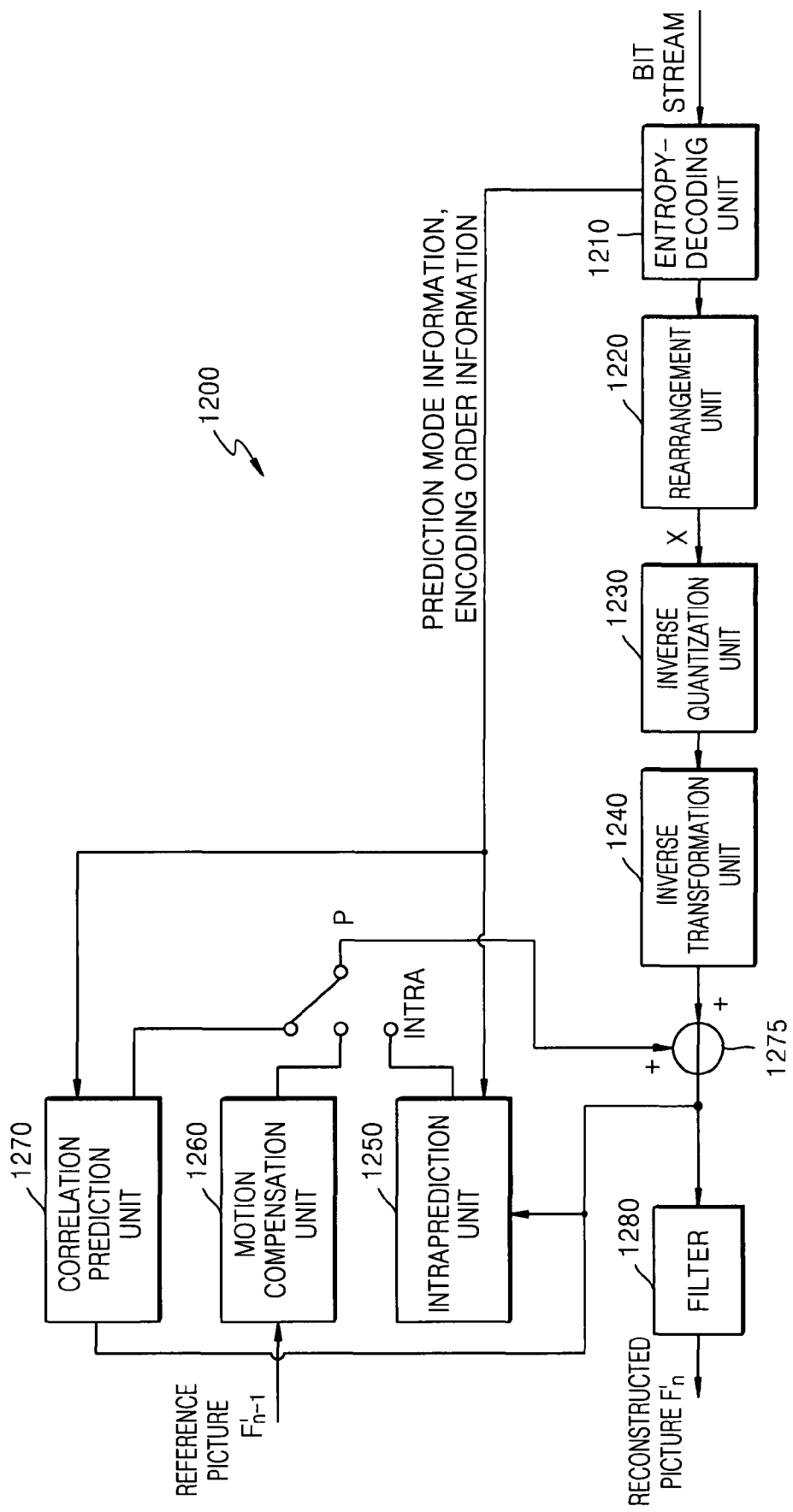
FIG. 12 is a block diagram of an image decoding apparatus according to an exemplary embodiment of the present invention.

FIG. 12 is a block diagram of an image decoding apparatus 1200 according to an exemplary embodiment of the present invention.

Referring to FIG. 12, the image decoding apparatus 1200 includes an entropy-decoding unit 1210, a rearrangement unit 1220, an inverse quantization unit 1230, an inverse transformation unit 1240, an intraprediction unit 1250, a motion compensation unit 1260, a correlation prediction unit 1270, and a filter 1280.

The entropy-decoding unit 1210 and the rearrangement unit 1220 receive a compressed bitstream and perform entropy-decoding, thereby generating a quantized coefficient. The inverse quantization unit 1230 and the inverse transformation unit 1240 perform inverse quantization and inverse transformation on the quantized coefficient in order to extract residue information, motion vector information, prediction mode information, and encoding order information for each color component image. Here, the prediction mode information may include a predetermined syntax indicating whether the compressed bitstream is, a bitstream encoded according to an exemplary embodiment of the present invention. If the compressed bitstream is encoded according to an exemplary embodiment of the present invention, the prediction mode information may include predictor information used for prediction of pixel values of a pixel block of the remaining color component images.

If the current pixel block is an interpredicted pixel block, the motion compensation unit 1260 generates a prediction pixel block of the current pixel block by motion compensation and estimation. If the current pixel block is an intrapredicted pixel block, the intraprediction unit 1250 generates a prediction pixel block of the current pixel block by performing intraprediction.

The addition unit 1275 adds the prediction pixel block of the first color component image that has been encoded first according to the extracted encoding order information and the first residue output from the inverse transformation unit 1240 in order to decode a pixel block of the first color component image.

The decoded pixel block of the first color component image is input to the correlation prediction unit 1270. The correlation prediction unit 1270 decodes a corresponding pixel block of another color component image using the decoded pixel block of the first color component image.

More specifically, like the correlation prediction unit 311 of FIG. 3, the correlation prediction unit 1270 substitutes pixel values of the decoded pixel block of the first color component image into Equation 1, thereby predicting pixel values of a pixel block of another color component image. If a third color component image included in the encoded bitstream is predicted using a second color component image included in the encoded bitstream, pixel values of a pixel block of the third color component image can be predicted using pixel values of a reconstructed pixel block of the second color component image.

By adding a second residue and a third residue output from the inverse transformation unit 1240 to prediction pixel blocks of the remaining color component images predicted by the correlation prediction unit 1270, pixel blocks of the remaining color component images are decoded.

When an edge in a pixel block is detected and a bitstream encoded for each of areas divided by the detected edge according to another exemplary embodiment of the present invention is decoded, the image decoding apparatus 1200 may further include an edge detection unit (not shown) that detects an edge in a pixel block of a first color component image from a received bitstream including a plurality of encoded color component images and an area division unit (not shown) that divides a pixel block of each of the color component images using the detected edge. In this case, the correlation prediction unit 1270 predicts pixel values in each area of corresponding pixel blocks of the B color component image and the R color component image using a decoded pixel block of the G color component image. Constants of a predictor used for prediction of pixel values of the remaining color component images may be determined using pixel values of a reconstructed neighbor pixel block or prediction mode information included in the bitstream.

FIG. 13 is a flowchart illustrating an image decoding method according to an exemplary embodiment of the present invention.

Referring to FIG. 13, in operation 1310, a bitstream including a plurality of encoded color component images is received.

In operation 1320, encoding order information for the plurality of color component images is extracted from the received bitstream.

In operation 1330, the first color component image that has been encoded first according to the extracted encoding order information is decoded.

In operation 1340, a prediction image for each of the remaining color component images following the first color component image is generated using a correlation with a previously decoded color component image according to the extracted encoding order information.

In operation 1350, a residue of each of the remaining color component images is added to the generated prediction image for each of the remaining color component images, thereby decoding the remaining color component images.

The exemplary embodiments of the present invention can also be embodied as computer-readable code on a computer-readable recording medium. The computer-readable recording medium is any data storage device that can store data which can be thereafter read by a computer system. Examples of computer-readable recording media may include read-only memory (ROM), random-access memory (RAM), CD-ROMs, magnetic tapes, floppy disks, and optical data storage devices. The computer-readable recording medium can also be distributed over a network of coupled computer systems so that the computer-readable code is stored and executed in a decentralized fashion.

As described above, according to an exemplary embodiment of the present invention, predictive encoding is performed using a correlation between a plurality of color component images forming a single image, thereby improving encoding efficiency.

Moreover, according to an exemplary embodiment of the present invention, encoding is performed on an RGB input image in an RGB domain without transformation into a YUV domain, thereby preventing color distortion during transformation of the RGB image into another color format and thus improving display quality.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image encoding method for encoding a plurality of color component images in an input image, the image encoding method comprising:
   (a) generating a prediction image for each of remaining color component images following a first color component image that has been encoded first among the plurality of color component images, using a correlation with a previously encoded color component image according to encoding orders;
   (b) calculating prediction errors between the remaining color component images and the generated prediction images corresponding thereto in order to determine an encoding order corresponding to a smallest prediction error; and
   (c) encoding the plurality of color component images according to the determined encoding order.

2. The image encoding method of claim 1, wherein (a) comprises predicting $\overline{Y_{i,j}}$ as follows:

$$\overline{Y_{i,j}} = a \times X_{i,j} + b,$$

where i and j are integers, i×j is a size of an input pixel block of the previously encoded color component image encoded prior to each of the remaining color component images, $X_{i,j}$ is a pixel value in an $i^{th}$ row and a $j^{th}$ column of a pixel block of the previously encoded color component image, $\overline{Y_{i,j}}$, corresponds to $X_{i,j}$ and is a prediction pixel value in an $i^{th}$ row and a $j^{th}$ column of a prediction pixel block of each of the remaining color component images, a is a weight indicating a correlation between the previously encoded color component image and each of the remaining color component images, and b is an offset value.

3. The image encoding method of claim 2, wherein a and b are determined based on a linear regression model.

4. The image encoding method of claim 2, wherein a and b are determined as values that minimize differences between prediction pixel values of a pixel block of each of the remaining color component images predicted using pixel values of the input pixel block of the previously encoded color component image and pixel values of an input pixel block of each of the remaining color component images.

5. The image encoding method of claim 2, wherein a and b are determined as values that minimize differences between prediction pixel values of a pixel block of each of the remaining color component images predicted using pixel values of a neighbor pixel block of the previously encoded color component image and original pixel values of the neighbor pixel block of the previously encoded color component image.

6. The image encoding method of, claim 1, wherein (a) comprises:
   detecting an edge in the first color component image;
   dividing each of the plurality of color component images into areas using the detected edge; and predicting pixel values in each of the areas of each of the remaining color component images using a correlation with the previously encoded color component image.

7. The image encoding method of claim 1, wherein the calculating comprises calculating the prediction errors using a sum of absolute differences between pixel values of each of the remaining color component images and pixel values of the prediction image of each of the remaining color component images.

8. The image encoding method of claim 1, wherein (b) comprises calculating the prediction errors in units of one selected from a macroblock, a slice, a picture, a group of pictures and a scene change, and determining an encoding order for each selected unit.

9. An image encoding method for encoding a plurality of color component images in an input image, the image encoding method comprising:
(a) generating a prediction image for each of remaining color component images following a first color component image that has been encoded first among the plurality of color component images, using a correlation with a previously encoded and reconstructed color component image according to encoding orders;
(b) determining sums of an amount of bits generated when a residue of a first color component image is encoded and an amount of bits generated when a residue corresponding to a difference between each of the remaining color component images and the generated prediction image for each of the encoding orders; and
(c) comparing the determined sums corresponding to the encoding orders to determine an encoding order corresponding to a smallest sum.

10. The image encoding method of claim 9, wherein (a) comprises predicting $\overline{Y_{i,j}}$ as follows:

$$\overline{Y_{i,j}} = a \times X'_{i,j} + b,$$

where i and j are integers, i×j is a size of a pixel block of the previously encoded and reconstructed color component image encoded prior to each of the remaining color component images, $X'_{i,j}$ is a pixel value in an $i^{th}$ row and a $j^{th}$ column of a pixel block of the previously encoded and reconstructed color component image, $\overline{Y_{i,j}}$ corresponds to $X'_{i,j}$ and is a prediction pixel value in an $i^{th}$ row and a $j^{th}$ column of a prediction pixel block of each of the remaining color component images, a is a weight indicating a correlation between the previously encoded and reconstructed color component image and each of the remaining color component images, and b is an offset value.

11. The image encoding method of claim 10, wherein a and b are determined based on a linear regression model.

12. The image encoding method of claim 10, wherein a and b are determined as values that minimize differences between prediction pixel values of a pixel block of each of the remaining color component images predicted using pixel values of a pixel block of the previously encoded and reconstructed color component image and pixel values of an input pixel block of each of the remaining color component images.

13. The image encoding method of claim 10, wherein a and b are determined as values that minimize differences between prediction pixel values of a neighbor pixel block of each of the remaining color component images predicted using pixel values of a neighbor pixel block of the previously encoded and reconstructed color component image and original pixel values of a neighbor pixel block of each of the remaining color component images.

14. The image encoding method of claim 9, wherein (a) comprises:
detecting an edge in the first color component image;
dividing each of the plurality of color component images into areas using the detected edge; and
predicting pixel values in each of the areas of each of the remaining color component images using a correlation with the previously encoded and reconstructed color component image.

15. The image encoding method of claim 9, wherein in (a), if there are at least two color component images that have been encoded and reconstructed prior to a currently encoded color component image, prediction images are generated using the previously encoded and reconstructed color component images and one of the previously encoded and reconstructed color component images, which is used to generate a prediction image having a smaller difference from the currently encoded color component image, is selected to generate a final prediction image.

16. The image encoding method of claim 9, further comprising (d) inserting information about the determined encoding order and information about the previously encoded and reconstructed color component image used for each of the remaining color component images into a header of an encoded bitstream.

17. The image encoding method of claim 9, wherein (c) comprises calculating a prediction error in units of one selected, from a slice, a picture, a group of pictures and a scene change, and determining the encoding order for each selected unit.

18. An image encoding apparatus for encoding a plurality of color component images in an input image, the image encoding apparatus comprising:
an encoding order determination unit which generates a prediction image for each of remaining color component images following a first color component image that has been encoded first among the plurality of color component images, using a correlation with a previously encoded color component image according to encoding orders, and calculates prediction errors between the remaining color component images and the generated prediction images corresponding thereto in order to determine an encoding order corresponding to a smallest prediction error; and
an encoding unit which encodes the plurality of color component images according to the determined encoding order.

19. The image encoding apparatus of claim 18, wherein the encoding order determination unit predicts $\overline{Y_{i,j}}$ as follows:

$$\overline{Y_{i,j}} = a \times X_{i,j} + b,$$

where i and j are integers, i×j is a size of an input pixel block of the previously encoded color component image; encoded prior to each of the remaining color component images, $X_{i,j}$ is a pixel value in an $i^{th}$ row and a $j^{th}$ column of a pixel block of the previously encoded color component image, $\overline{Y_{i,j}}$, is corresponds to $X_{i,j}$, and is a prediction pixel value in an $i^{th}$ row and a $j^{th}$ column of a prediction pixel block of each of the remaining color component images, a is a weight indicating a correlation between the previously encoded color component image and each of the remaining color component images, and b is an offset value.

20. The image encoding apparatus of claim 18, wherein the encoding order determination unit comprises:

an edge detection unit which detects an edge in the first color component image; and an area division unit which divides each of the plurality of color component images into areas using the detected edge, wherein the encoding unit predicts pixel values in each of the areas of each of the remaining color component images using a correlation with the previously encoded color component image.

21. The image encoding apparatus of claim 18, wherein the encoding order determination unit calculates the prediction errors using a sum of absolute differences between pixel values of each of the remaining color component images and pixel values of the prediction image of each of the remaining color component images.

22. The image encoding apparatus of claim 18, wherein the encoding order determination unit calculates the prediction errors in units of one selected from a macroblock, a slice, a picture, a group of pictures and a scene change and determining the encoding order for each selected unit.

23. An image encoding apparatus for encoding a plurality of color component images in an input image, the image encoding apparatus comprising:

a correlation prediction unit which generates a prediction image for each of the remaining color component images following a first color component image that has been encoded first among the plurality of color component images, using a correlation with a previously encoded and reconstructed color component image according to encoding orders; and an encoding order determination unit which determines a sums of an amount of bits generated when a residue of the first color component image is encoded and an amount of bits generated when a residue corresponding to a difference between each of the remaining color component images and the generated prediction image for each of the encoding orders and comparing the sums corresponding to the encoding orders to determine an encoding order corresponding to a smallest sum.

24. The image encoding apparatus of claim 23, wherein the correlation prediction unit predicts $\overline{Y_{i,j}}$ as follows:

$$\overline{Y_{i,j}} = a \times X'_{i,j} + b$$

where i and j are integers, i×j is a size of a pixel block of the previously encoded and reconstructed color component image encoded prior to each of the remaining color component images, $X'_{i,j}$ is a pixel value in an $i^{th}$ row and a $j^{th}$ column of a pixel block of the previously encoded and reconstructed color component image, $\overline{Y_{i,j}}$ corresponds to $X'_{i,j}$, and is a prediction pixel value in an $i^{th}$ row and a $j^{th}$ column of a prediction pixel block of each of the remaining color component images, a is a weight indicating a correlation between the previously encoded and reconstructed color component image and each of the remaining color component images, and b is an offset value.

25. The image encoding apparatus of claim 24, wherein a and b are determined based on a linear regression model.

26. The image encoding apparatus of claim 23, wherein the correlation prediction unit predicts pixel values in each of areas of each of the remaining color component images using a correlation with the previously encoded and reconstructed color component image, the areas being divided by an edge in the first color component image.

27. The image encoding apparatus of claim 23, wherein if at least two color component images have been encoded and reconstructed prior to a currently encoded color component image, the correlation prediction unit generates prediction images using the previously encoded and reconstructed color component images and selects one of the previously encoded and reconstructed color component images, which is used to generate a prediction image having a smaller difference from the currently encoded color component image, in order to generate a final prediction image.

28. The image encoding apparatus of claim 23, wherein the encoding order determination unit calculates the prediction errors in units of one selected from a macroblock, a slice, a picture, a group of pictures and a scene change, and determines the encoding order for each selected unit.

29. An image decoding method for decoding a plurality of encoded color component images in a bitstream, the image decoding method comprising:

(a) receiving a bitstream including the plurality of encoded color component images;

(b) extracting encoding order information for the plurality of color component images from the bitstream;

(c) generating prediction images for each of remaining color component images following a first color component image that has been encoded first among the plurality of color component images using a correlation with a previously decoded color component image according to the extracted encoding order information; and (d) adding residues of the remaining color component images in the bitstream to the generated prediction images, to thereby decode the remaining color component images.

30. The image decoding method of claim 29, wherein (d) comprises predicting $\overline{Y_{i,j}}$ as follows:

$$\overline{Y_{i,j}} = a \times X_{i,j} + b,$$

where i and j are integers, i×j is a size of an input pixel block of the previously encoded color component image encoded prior to each of the remaining color component images, $X_{i,j}$ is a pixel value in an $i^{th}$ row and a $j^{th}$ column of a pixel block of the previously encoded color component image, $\overline{Y_{i,j}}$ corresponds to $X_{i,j}$ and is a prediction pixel value in an $i^{th}$ row and a $j^{th}$ column of a prediction pixel block of each of the remaining color component images, a is a weight indicating a correlation between the previously encoded color component image and each of the remaining color component images, and b is an offset value.

31. The image decoding method of claim 29, wherein the encoding order information is set in units of one selected from a slice, a picture, a group of pictures and a scene change for transmission.

32. An image decoding apparatus for decoding a plurality of encoded color component images in a bitstream, the image decoding apparatus comprising:

a correlation prediction unit which generates a prediction image for each of remaining color component images following a first color component image that has been encoded first among the plurality of color component images, using a correlation with a previously encoded and reconstructed color component image according to encoding order information for the plurality of color component images extracted from the bitstream; and an addition unit which adds residues of the remaining color component images in the bitstream to the generated prediction images, to thereby decode the remaining color component images.

33. The image decoding apparatus of claim 32, wherein the correlation prediction unit predicts $\overline{Y_{i,j}}$ as follows:

$$\overline{Y_{i,j}} = a \times X_{i,j} + b,$$

where i and j are integers, i×j is a size of an input pixel block of the previously encoded color component image encoded prior to each of the remaining color component images, $X_{i,j}$ is a pixel value in an $i^{th}$ row and a $j^{th}$ column of a pixel block of the previously encoded color component image, $\overline{Y_{i,j}}$ corresponds to $X_{i,j}$ and is a prediction pixel value in an $i^{th}$ row and a $j^{th}$ column of a prediction pixel block of each of the remaining color component images, a is a weight indicating a correlation between the previously encoded color component image and each of the remaining color component images, and b is an offset value.

34. The image decoding apparatus of claim 32, wherein the encoding order information is set in units of one selected from a slice, a picture, a group of pictures and a scene change for transmission.

* * * * *